(12) United States Patent
Peng et al.

(10) Patent No.: US 12,375,344 B2
(45) Date of Patent: Jul. 29, 2025

(54) NETWORK CONNECTION METHOD AND APPARATUS, DEVICE, STORAGE MEDIUM, AND PROGRAM PRODUCT

(71) Applicant: Tencent Technology (Shenzhen) Company Limited, Guangdong (CN)

(72) Inventors: Jiangao Peng, Shenzhen (CN); Zhaopeng Liang, Shenzhen (CN); Huanzhi Chen, Shenzhen (CN); Zhichao Liu, Shenzhen (CN); Weibang Luo, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 32 days.

(21) Appl. No.: 18/379,646

(22) Filed: Oct. 12, 2023

(65) Prior Publication Data

US 2024/0056351 A1    Feb. 15, 2024

Related U.S. Application Data

(63) Continuation of application No. PCT/CN2022/133372, filed on Nov. 22, 2022.

(30) Foreign Application Priority Data

Feb. 21, 2022 (CN) .......................... 202210158244.7

(51) Int. Cl.
*H04L 41/0803* (2022.01)
*H04L 9/06* (2006.01)
(Continued)

(52) U.S. Cl.
CPC ........ *H04L 41/0803* (2013.01); *H04L 9/0618* (2013.01); *H04L 9/0841* (2013.01); *H04L 67/141* (2013.01)

(58) Field of Classification Search
CPC . H04L 41/0803; H04L 9/0618; H04L 9/0841; H04L 67/141; H04L 2209/805;
(Continued)

(56) References Cited

U.S. PATENT DOCUMENTS 5,724,425 A * 3/1998 Chang ................... G06F 21/125
705/52
7,006,633 B1 * 2/2006 Reece ....................... H04L 9/08
380/260

(Continued)

FOREIGN PATENT DOCUMENTS

CN           105282158 A      1/2016

OTHER PUBLICATIONS

International Search Report issued Feb. 20, 2023 in Application No. PCT/CN2022/133372, with English Translation, pp. 1-7.

*Primary Examiner* — Michael Won
(74) *Attorney, Agent, or Firm* — Banner & Witcoff, Ltd.

(57) ABSTRACT

In a network connection method, a first management frame for performing a network connection is received from a to-be-accessed Internet of things device. The first management frame includes device attribute information of the Internet of things device. The device attribute information of the Internet of things device is transmitted to a terminal device connected to the network device. A target verification result of a validity verification of the Internet of things device that is performed in response to the device attribute information is received from the terminal device. A second management frame that includes network attribute information of the network device is generated based on the target verification result, the target verification result indicating that the Internet of things device is valid. The second management frame is transmitted to the Internet of things device.

20 Claims, 11 Drawing Sheets

(51) Int. Cl.
*H04L 9/08* (2006.01)
*H04L 67/141* (2022.01)

(58) Field of Classification Search
CPC ....... H04L 9/0838; H04L 9/0872; H04L 9/50;
H04L 67/12; H04L 67/14; H04L 63/0428;
H04L 9/08; H04L 65/00; H04L 65/1069;
H04W 76/10; H04N 21/4367
See application file for complete search history.

(56) References Cited

U.S. PATENT DOCUMENTS

| | | | | |
|---|---|---|---|---|
| 8,705,730 B2* | 4/2014 | Lieber | ............ | H04L 9/0894 |
| | | | | 380/28 |
| 9,300,464 B1* | 3/2016 | Roth | ............ | H04L 9/0891 |
| 9,917,824 B2* | 3/2018 | Britt | ............ | H04W 12/069 |
| 10,015,766 B2* | 7/2018 | Britt | ............ | H04L 63/0428 |
| 10,169,626 B2* | 1/2019 | Britt | ............ | G06K 7/10257 |
| 10,419,930 B2* | 9/2019 | Holland | ............ | H04W 12/069 |
| 11,470,161 B2* | 10/2022 | Senftleber | ............ | H04L 63/08 |
| 11,601,398 B2* | 3/2023 | Senftleber | ............ | H04L 67/025 |
| 2010/0313021 A1* | 12/2010 | Xu | ............ | H04L 9/0827 |
| | | | | 713/168 |
| 2016/0072839 A1* | 3/2016 | Mortimore, Jr. | ............ | H04L 63/0876 |
| | | | | 726/1 |
| 2016/0277391 A1* | 9/2016 | Choyi | ............ | H04L 63/062 |
| 2017/0017822 A1* | 1/2017 | Zimmerman | ............ | G06K 7/1452 |
| 2017/0171314 A1* | 6/2017 | Britt | ............ | G06Q 20/308 |
| 2018/0343238 A1* | 11/2018 | Tola | ............ | H04L 63/0421 |
| 2019/0058697 A1* | 2/2019 | Chang | ............ | H04L 63/0807 |
| 2020/0092701 A1* | 3/2020 | Arnberg | ............ | H04L 67/306 |
| 2020/0153813 A1* | 5/2020 | Wu | ............ | H04L 9/3297 |
| 2023/0195943 A1* | 6/2023 | Wu | ............ | G06F 21/755 |
| | | | | 713/189 |
| 2025/0098002 A1* | 3/2025 | Gao | ............ | H04W 12/08 |

* cited by examiner

NETWORK CONNECTION METHOD AND APPARATUS, DEVICE, STORAGE MEDIUM, AND PROGRAM PRODUCT

RELATED APPLICATIONS

This application is a continuation of International Application No. PCT/CN2022/133372, filed on Nov. 22, 2022, which claims the benefit of priority to Chinese Patent Application No. 202210158244.7, entitled "NETWORK CONNECTION METHOD AND APPARATUS, DEVICE, AND STORAGE MEDIUM" filed on Feb. 21, 2022. The entire contents of the prior application are hereby incorporated by reference in their entirety.

FIELD OF THE TECHNOLOGY

This disclosure relates to the field of Internet technologies, including to network connection.

BACKGROUND OF THE DISCLOSURE

The Internet of things (IoT) is, for example, an "Internet that connects everything", an extended and expanded network based on the Internet, and a network formed by combining various information sensing devices with a network, to implement interconnection of people, machines and things at any time and any place. For example, more and more Internet of things devices such as smart home appliances may have access to the Internet, so that the smart home appliances can receive instructions transmitted by a terminal device, and the smart home appliances execute the instructions to change working statuses of the smart home appliances.

In a process of connecting an Internet of things device to the Internet, first, a working mode of the Internet of things device needs to be switched to a wireless access point (AP) mode, and a wireless access point needs to be created in the AP mode. Then, a terminal device needs to obtain network attribute information (such as a network account and a password) of a network device inputted by a user, and transmits the network attribute information to the Internet of things device through the wireless access point. After the Internet of things device receives the network attribute information, the working mode of the Internet of things device needs to be switched to a station (STA) mode, so that the Internet of things device can be connected to a network corresponding to the network device based on the network attribute information. In practice, it is found that in such a manner of networking the Internet of things device, the Internet of things device needs to switch between different working modes, and the user needs to manually input the network attribute information, resulting in low networking efficiency of the Internet of things device.

SUMMARY

Embodiments of this disclosure provide a network connection method and apparatus, a device, a non-transitory computer-readable storage medium, and a program product, which can improve network connection efficiency of an Internet of things device.

An aspect of the embodiments of this disclosure provides a network connection method that may be implemented by a data processing apparatus including processing circuitry.

In an aspect, a network device may perform the network connection method, which may include receiving, by a network device, a first management frame for performing a network connection from a to-be-accessed Internet of things device. The first management frame may include device attribute information of the Internet of things device. The network connection method may include transmitting the device attribute information of the Internet of things device to a terminal device connected to the network device. The network connection method may further include receiving, from the terminal device, a target verification result of a validity verification of the Internet of things device that is performed in response to the device attribute information. The network connection method may further include generating a second management frame that includes network attribute information of the network device based on the target verification result, in which the target verification result may indicate that the Internet of things device is valid. The network connection method may further include transmitting the second management frame to the Internet of things device, in which the second management frame may indicate the Internet of things device is to establish a network connection with the network device based on the network attribute information in the second management frame.

In an aspect of the embodiments of this disclosure, an Internet of things device may perform a network connection method, including broadcasting a first management frame including device attribute information of the Internet of things device to a network device. The first management frame may indicate the network device is to transmit the device attribute information of the Internet of things device in the first management frame to a terminal device. The device attribute information of the Internet of things device may indicate the terminal device to perform validity verification of the Internet of things device. The network connection method may include receiving a second management frame from the network device, in which the second management frame being generated by the network device according to network attribute information of the network device based on a determination that a target verification result of the validity verification indicating that the Internet of things device is valid is received. The network connection method may further include parsing the second management frame to obtain the network attribute information of the network device, and establishing a network connection with the network device according to the network attribute information.

In an aspect of the embodiments of this disclosure, a terminal device may perform a network connection method, including: receiving, by a terminal device, device attribute information of a to-be-accessed Internet of things device from a network device, in which the device attribute information may be obtained by parsing a first management frame transmitted by the Internet of things device. The network connection method may include performing validity verification of the Internet of things device according to the device attribute information, and generating, in response to determining that the validity verification of the Internet of things device is valid, a target verification result for indicating that the Internet of things device is valid. The network connection method may further include transmitting the target verification result to the network device, in which the target verification result may indicate to the network device to transmit a second management frame to the Internet of things device. The second management frame may include network attribute information of the network device, and the second management frame may indicate to the Internet of things device to establish a network connection with the network device based on the network attribute information in the second management frame.

One aspect of the embodiments of this disclosure provides a computer device, including: a processor, a memory, and a network interface, The processor is connected to the memory and the network interface, the network interface being used for providing a data communication function, the memory being configured to store a computer program, and the processor being configured to call the computer program to cause the computer device to perform the data processing method based on the blockchain provided by the embodiments of this disclosure.

One aspect of the embodiments of this disclosure provides a non-transitory computer-readable storage medium, the computer-readable storage medium storing instructions which when executed by a processor cause the processor to perform the data processing method based on the blockchain provided by the embodiments of this disclosure.

One aspect of the embodiments of this disclosure provides a computer program product. The computer program product includes a computer program. The computer program is stored in a computer-readable storage medium. A processor of a computer device reads the computer program from the computer-readable storage medium and executes the computer program, causing the computer device to perform the data processing method based on the blockchain provided by the embodiments of this disclosure.

In this disclosure, in a case that an Internet of things device needs to communicate with a terminal device, the Internet of things device may generate a first management frame carrying device attribute information of the Internet of things device, and transmit the first management frame to a network device connected to the terminal device. After the first management frame is received, the network device may transmit the device attribute information of the Internet of things device to the terminal device. In a case that the device attribute information of the Internet of things device is received, the terminal device may perform verification on validity of the Internet of things device according to the device attribute information of the Internet of things device, to obtain a verification result, and return the verification result to the network device. In a case that the verification result is a target verification result for indicating that the Internet of things device is valid, the network device may generate a second management frame according to network attribute information of the network device, and transmit the second management frame to the Internet of things device. After the second management frame is received, the Internet of things device may establish a network connection with the network device according to the network attribute information. It can be seen that, in a process of performing a network connection with the Internet of things device, the network device transmits the network attribute information in the second management frame to the Internet of things device, and a user does not need to manually input the network attribute information, so that network connection efficiency of the Internet of things device can be improved, in other words, rapid network distribution of the Internet of things device is achieved.

DESCRIPTION OF EMBODIMENTS

The technical solutions in the embodiments of this disclosure are described in the following with reference to the accompanying drawings. The described embodiments are merely some rather than all of the embodiments of this disclosure. Other embodiments are within the scope of this disclosure.

Figure 1:
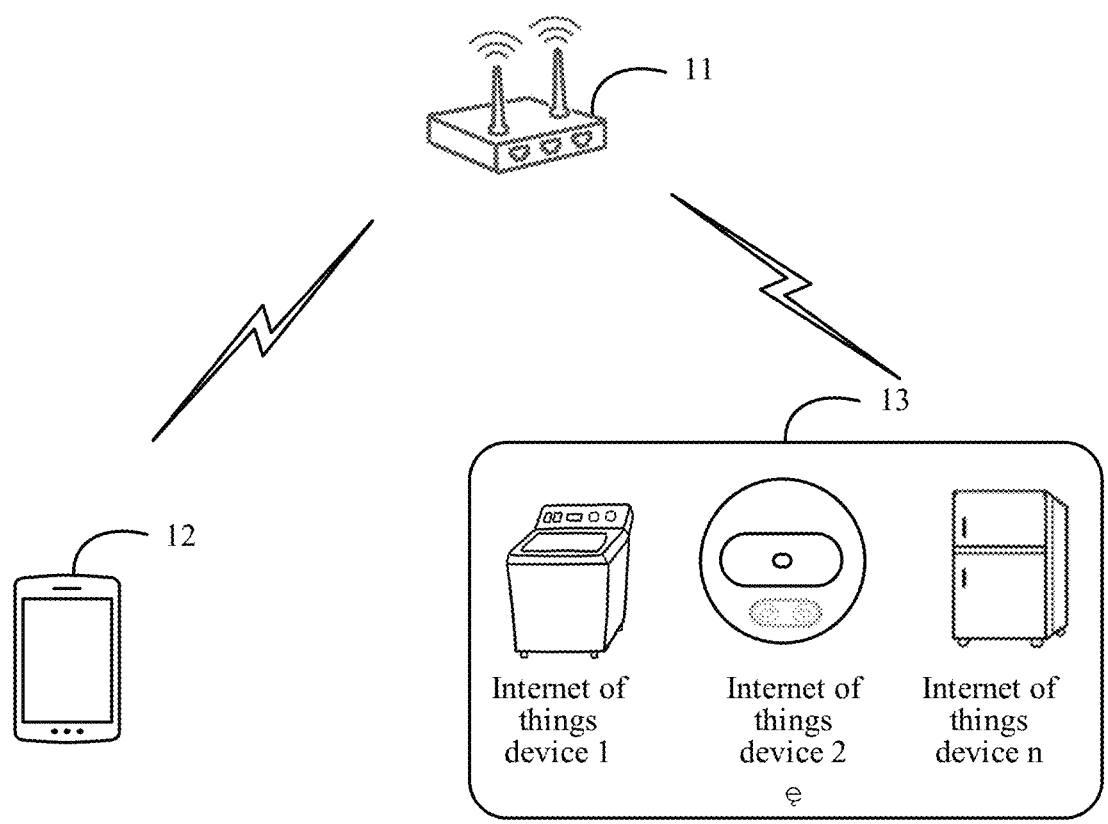
FIG. 1 is a schematic architectural diagram of a network connection system according to an embodiment of this disclosure.

To facilitate a clearer understanding of this disclosure, a network connection system that implements a network connection method of this disclosure is first introduced. FIG. 1 is a schematic architectural diagram of a network connection system according to this disclosure. As shown in FIG. 1, the network connection system includes a network device 11, a terminal device 12, and an Internet of things device cluster 13. The Internet of things device cluster 13 includes one or more Internet of things devices. The Internet of things device may be a smart home appliance, a smart office device, or the like. The smart home appliance may include one or more of a smart lamp, a smart refrigerator, a sweeping robot, a smart washing machine, a smart air conditioner, and the like. The smart office device includes a smart printer, a projector, and the like. A quantity and types of the Internet of things devices are not limited herein. For example, as shown in FIG. 1, the Internet of things device cluster 13 includes an Internet of things device 1, an Internet of things device 2, . . . , an Internet of things device n. The Internet of things device 1 may be a smart washing machine, the Internet of things device 2 may be a sweeping robot, and the Internet of things device n may be a smart refrigerator.

It may be understood that a network connection is performed between the terminal device 12 and the network device 11, so that the terminal device 12 can perform data interaction with the network device 11 through the network connection.

The terminal device 12 may be a device configured to establish a network connection between the network device 11 and an Internet of things device. For example, the terminal device 12 may be configured to perform verification on validity of the Internet of things device according to device attribute information of the Internet of things device, generate, in a case (e.g., based on a determination) that the Internet of things device is valid, a target verification result for indicating that the Internet of things device is valid, and transmit the target verification result to the network device 11. In this way, establishment of a network connection between an invalid Internet of things device and a network device can be avoided, thereby improving security of the network connection of the Internet of things device. After the network connection between the Internet of things device and the network device is established, the terminal device 12 may be further configured to transmit a working instruction to the Internet of things device through the network device 11, where the working instruction is for indicating the Internet of things device to change a working status. For example, the working instruction is a start working instruction, and the start working instruction is for indicating the Internet of things device to start to work. For example, the terminal device 12 may be an in-vehicle terminal, a smartphone, a tablet computer, a notebook computer, a desktop computer, a smart speaker, a speaker with a screen, a smartwatch, or the like, but is not limited thereto.

The network device 11 may be a gateway device used for communication between the terminal device 12 and the Internet of things device. For example, in a case that the target verification result that is transmitted by the terminal device 12 and related to the Internet of things device is received, the network device 11 generates a management frame carrying network attribute information according to the network attribute information of the network device 11, and transmits the management frame carrying the network attribute information to the Internet of things device. The Internet of things device establishes a network connection with the network device 11 according to the management frame carrying the network attribute information. The network device 11 may be a gateway device such as a router.

Figure 2:
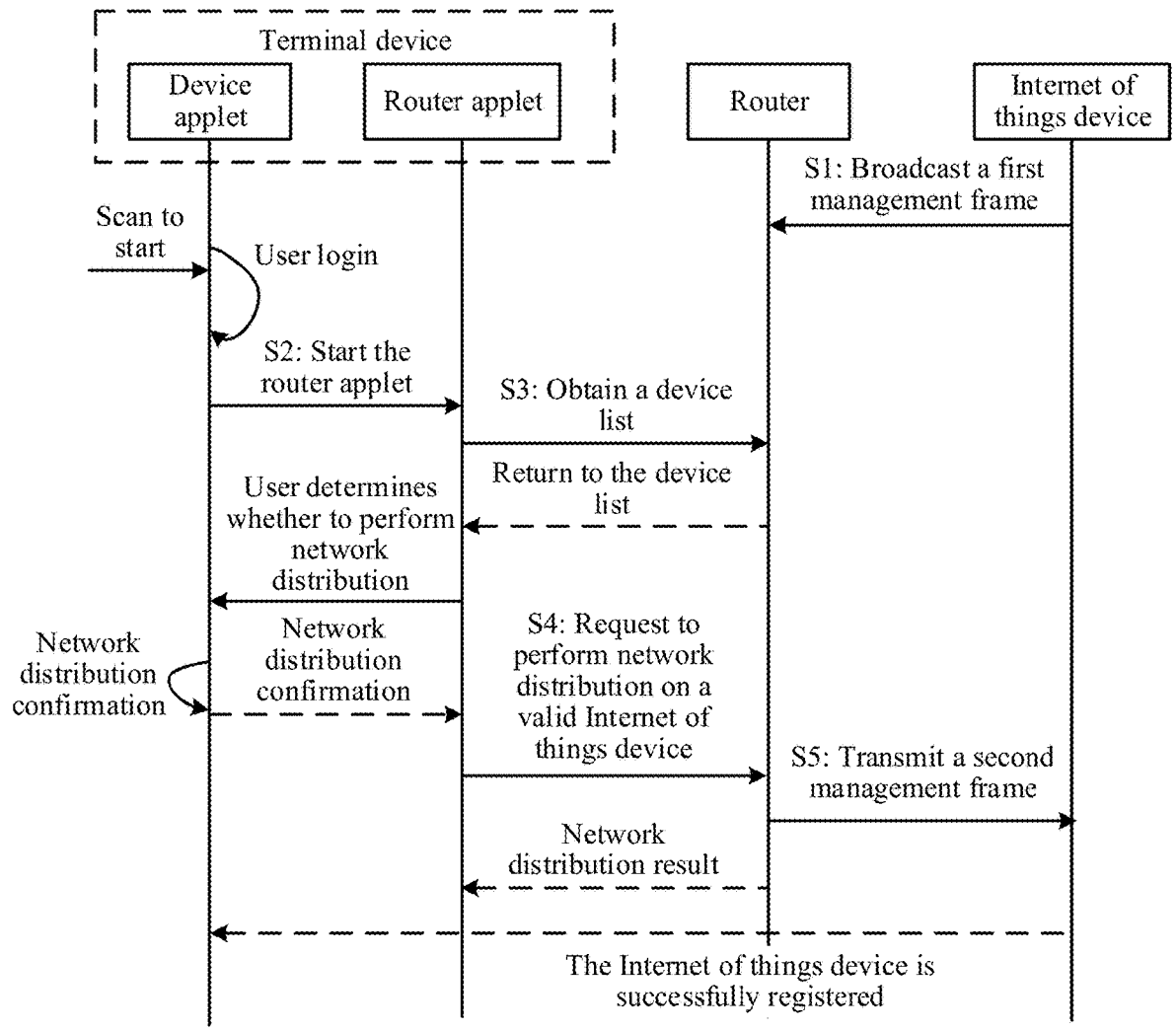
FIG. 2 is a schematic diagram of an interaction scenario among various devices in a network connection system according to an embodiment of this disclosure.

FIG. 2 is a schematic diagram of a network connection scenario according to an embodiment of this disclosure. A router in FIG. 2 may be the network device in FIG. 1, a terminal device in FIG. 2 may be the terminal device in FIG. 1, and an Internet of things device in FIG. 2 may be any Internet of things device in FIG. 1. As shown in FIG. 2, a process of performing network distribution on the Internet of things device mainly includes S1 to S5.

S1: The Internet of things device broadcasts a first management frame.

In a case that the Internet of things device needs to communicate with the terminal device, the Internet of things device may broadcast the first management frame carrying device attribute information of the Internet of things device to the router. In a case (e.g., based on a determination) that the first management frame is received, the router used as the network device may parse the first management frame, to obtain the device attribute information of the Internet of things device, and further add the Internet of things device to a device list.

In an embodiment of this disclosure, the Internet of things device does not need to establish a wireless network by using the Internet of things device as an AP, and the first management frame may be for performing broadcasting transmission through a network established by the network device. For example, the network device establishes a wireless network. The terminal device is connected to the network device through the wireless network, the Internet of things device is within a signal coverage of the wireless network, and the Internet of things device broadcasts the first management frame through the wireless network. The first management frame may be a wireless network management frame, for example, a Prob Request management frame.

A second management frame mentioned in subsequent steps may also be transmitted to the Internet of things device through the network established by the network device in the same manner, so that the Internet of things device does not need to establish a wireless network in the entire process of establishing a network connection with the network device, to be specific, the Internet of things device does not need to adjust an own mode to an AP mode, but can stay in a STA mode, without switching between different working modes, thereby improving connection efficiency and a network distribution speed.

S2: The terminal device starts a router applet.

Figure 3:
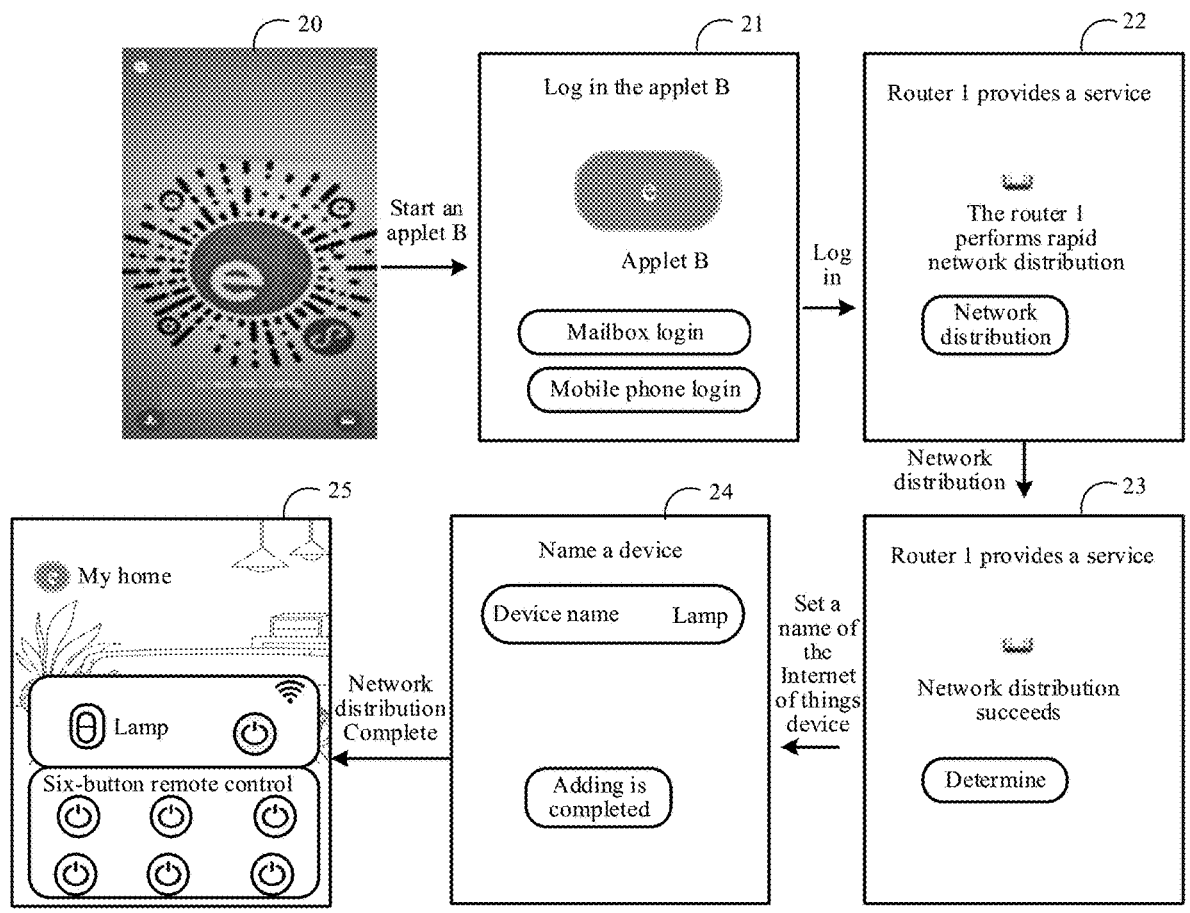
FIG. 3 is a schematic diagram of a scenario of performing network distribution on an Internet of things device according to an embodiment of this disclosure.

The router applet may be an applet configured to establish a network connection between the router and the Internet of things device. In an example, the terminal device may start the router applet in a code scanning manner. FIG. 3 is a schematic diagram of a scenario of performing network distribution on an Internet of things device according to this disclosure. As shown in FIG. 3, the terminal device may perform scanning processing on a graphic code 20 on the Internet of things device through a device applet (namely, an applet A), to start the router applet (namely, an applet B). The device applet is a device applet configured to manage the Internet of things device. Further, the terminal device may display a login interface 21 of the router applet (namely, the applet B), where a mailbox login manner and a mobile phone login manner are displayed in the login interface 21. A user may independently select the mailbox login manner or the mobile phone login manner to log in to the router applet. In a case that the user successfully logs in to the router applet, the terminal device may display a network distribution interface 22 of the router applet. The network distribution interface 22 may include a router (namely, a router 1) associated with the terminal device and a network distribution option. In a case that the user needs to perform network distribution on the Internet of things device, a trigger operation may be performed on the network distribution option. In a case that the terminal device detects the trigger operation on the network distribution option, S3 is performed.

Figure 4:
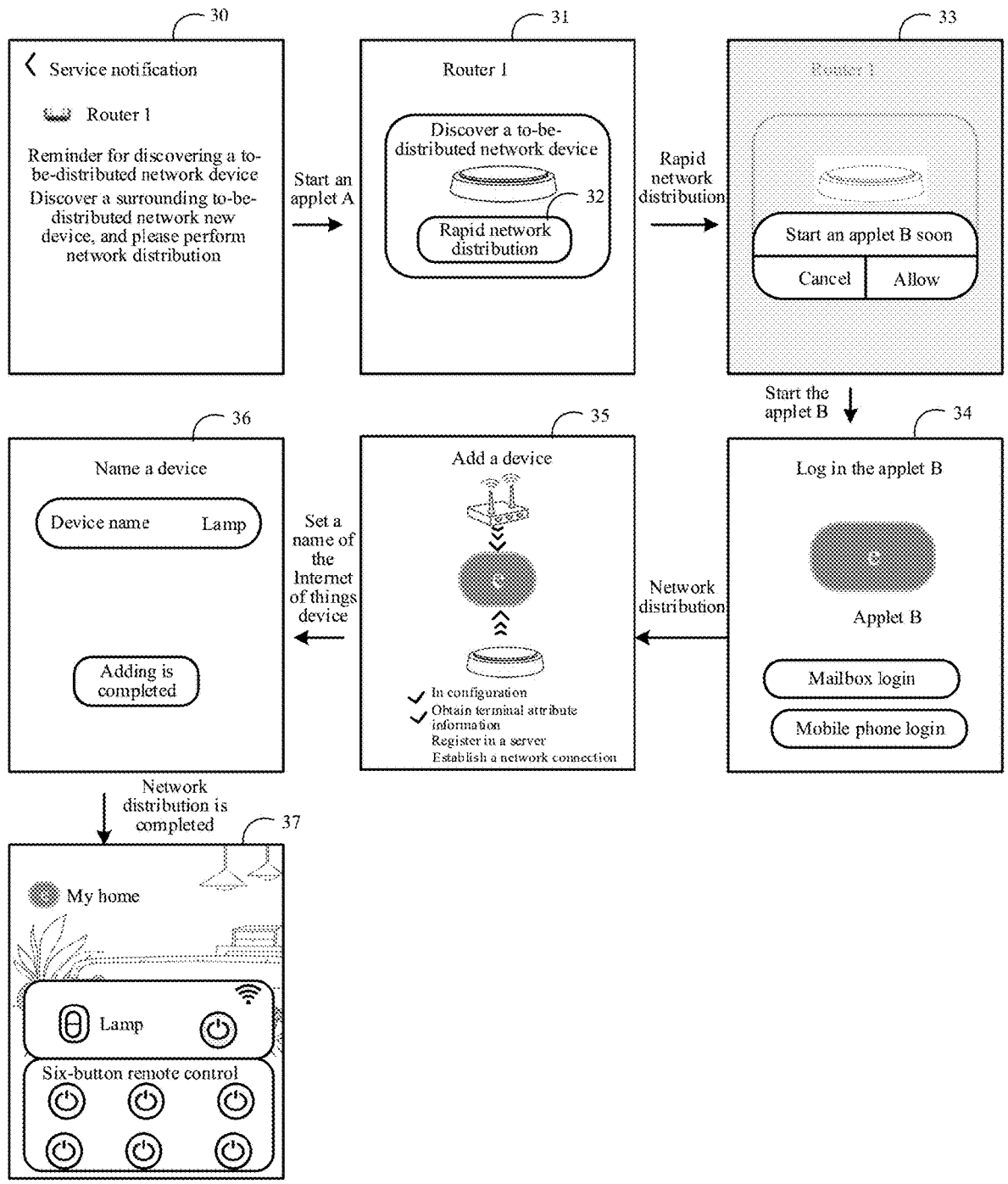
FIG. 4 is a schematic diagram of a scenario of performing network distribution on an Internet of things device according to an embodiment of this disclosure.

In an example, the terminal device may start the router applet by using a notification message. FIG. 4 is a schematic diagram of a scenario of performing network distribution on an Internet of things device according to this disclosure. As shown in FIG. 4, a terminal device may obtain an Internet of things device on which network distribution needs to be performed from the router, or in a case that the terminal device detects a to-be-distributed network Internet of things device, a notification message may be generated, where the notification message is for notifying a user to perform network distribution on the to-be-distributed network Internet of things device in a timely manner. The terminal device may display a notification message 30. If a viewing operation of the user on the notification message 30 is detected, a device applet may be started, a network distribution interface 31 of the device applet is displayed on the terminal device, and a to-be-distributed network Internet of things device (namely, a smart lamp) and a rapid network distribution option 32 are displayed in the network distribution interface 31. If a touch operation on the rapid network distribution option 32 is detected, a confirmation interface 33 for starting the router applet is outputted, where the confirmation interface 33 includes a confirmation option (namely, permission) and a cancel option for starting the router applet. If a touch operation on the confirmation option is detected, the router applet may be started, and a login interface 34 of the router applet is displayed. A mailbox login manner and a mobile phone login manner are displayed in the login interface 34. The user may independently select the mailbox login manner or the mobile phone login manner to log in to the router applet. In a case that the user successfully logs in to the router applet, the terminal device may start the router applet, and perform S3.

S3: The terminal device obtains a device list.

The terminal device may obtain the device list from the router; perform verification on validity of the Internet of things device in the device list to obtain a verification result; and perform S4 if the Internet of things device in the device list is valid; or may refuse to perform network distribution on the Internet of things device in the device list if the Internet of things device is invalid. In a case (e.g., based on a determination) that the Internet of things device in the device list is valid, the terminal device displays the Internet of things device that is valid in the device list, and the user determines whether to perform network distribution on the Internet of things device that is valid. If a network distribution confirmation instruction for performing network distribution on the Internet of things device that is valid is received, S4 is performed.

S4: The terminal device requests to perform network distribution on a valid Internet of things device.

The terminal device may obtain the Internet of things device that is valid from the device list, request the router to perform network distribution on the valid Internet of things device, and transmit a verification result of the Internet of things device to the router, where the verification result is for indicating the router to perform network distribution on the Internet of things device that is valid.

S5: The router transmits a second management frame to the Internet of things device.

The router may generate a second management frame carrying network attribute information of the router, and transmit the second management frame to the Internet of things device that is valid. As described above, the second management frame may be transmitted to the Internet of things device based on the wireless network established by the router, and the second management frame may be a wireless network management frame, for example, a Prob Response management frame. After the second management frame is received, the Internet of things device may parse the second management frame, to obtain the network attribute information, establish the network connection with the router according to the network attribute information, and transmit a connection result (namely, a network distribution result) to the terminal device. In an example, as shown in FIG. 3, after the network distribution result is received, the terminal device may display a configuration result interface 23 of the router applet, where the configuration result interface 23 includes the network distribution result (namely, successful network distribution) and the router (namely, a router 1). Further, the user may confirm the network distribution result. After a confirmation instruction is received, the terminal device may display a name setting interface 24 of the Internet of things device, where the name setting interface 24 may include a name of the Internet of things device. The user may modify the name of the Internet of things device. After the user sets the name of the Internet of things device, the terminal device may display an Internet of things device detection interface 25, where the Internet of things device detection interface 25 includes an on-off key and the like of the Internet of things device. Through the on-off key, a working status of the Internet of things device may be changed, to implement interaction between the terminal device and the Internet of things device.

In an example, as shown in FIG. 4, after the terminal device receives the network distribution result, the terminal device may display a configuration result interface 35 of the router applet, where the configuration result interface 35 may include the router (namely, a router 1) associated with the terminal device, the Internet of things device, and a configuration process (for example, being configured, and configuration completed). In a case that the configuration is completed, the terminal device may display a name setting interface 36 of the Internet of things device, where the name setting interface 36 may include a name of the Internet of things device. The user may modify the name of the Internet of things device. After the user sets the name of the Internet of things device, the terminal device may display an Internet of things device detection interface 37, where the Internet of things device detection interface 37 includes an on-off key and the like of the Internet of things device. Through the on-off key, a working status of the Internet of things device may be changed, to implement interaction between the terminal device and the Internet of things device.

Figure 5:
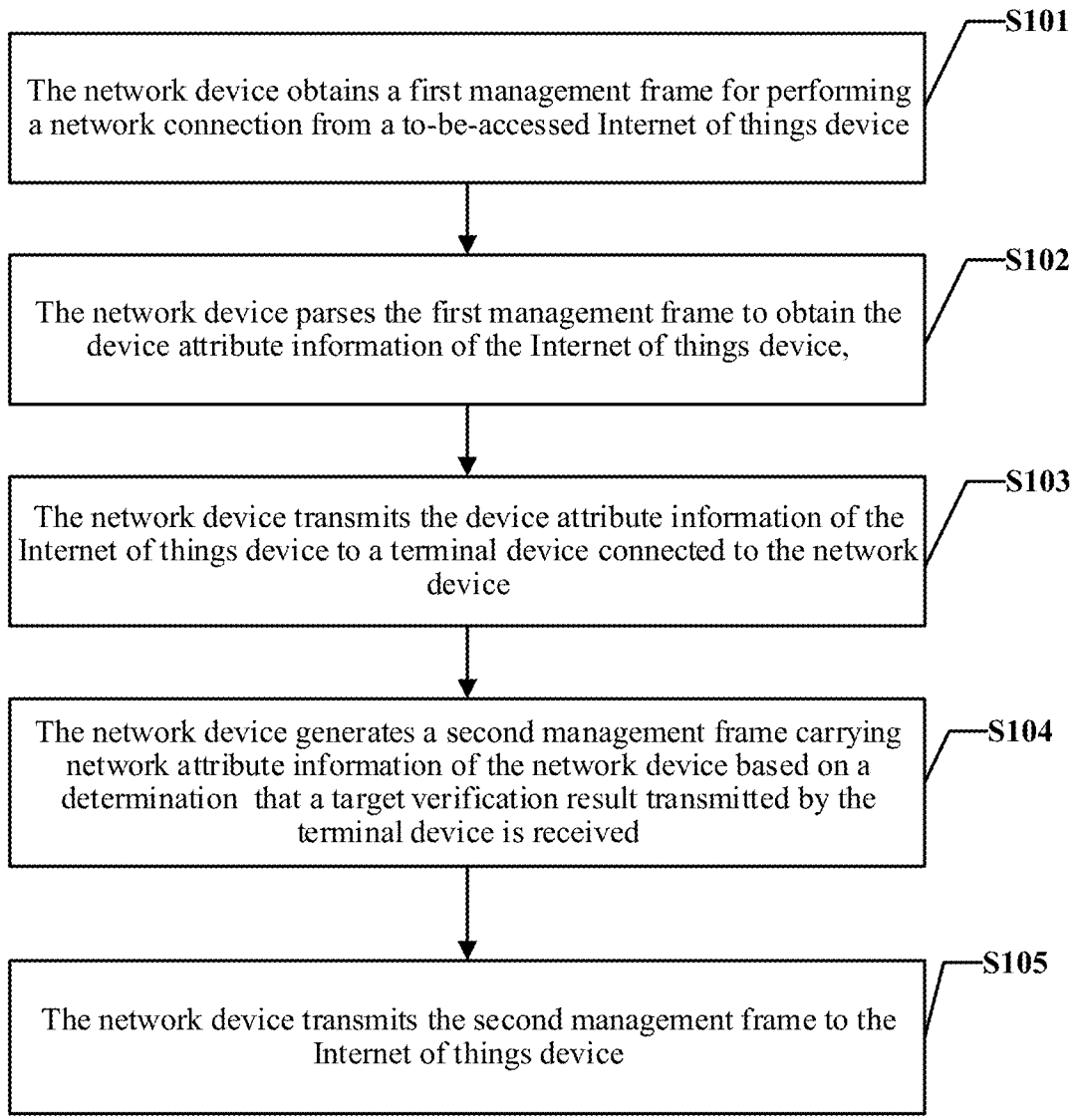
FIG. 5 is a schematic flowchart of a network connection method according to an embodiment of this disclosure.

FIG. 5 is a schematic flowchart of a network connection method according to an embodiment of this disclosure. As shown in FIG. 5, the method may be performed by the network device in FIG. 1. The network connection method may include the following S101 to S105.

S101: The network device obtains a first management frame for performing a network connection from a to-be-accessed Internet of things device.

In this disclosure, the to-be-accessed Internet of things device may be an Internet of things device that is newly installed by a user corresponding to a terminal device, or the to-be-accessed Internet of things device may be an Internet of things device on which network distribution needs to re-performed. The network device may obtain the first management frame for performing the network connection from the to-be-accessed Internet of things device, where the first management frame may be obtained by encapsulating device attribute information of the Internet of things device, and the device attribute information may include one or more of a public key of the Internet of things device, a device identifier of the Internet of things device, a location of the Internet of things device, a purchase record, and the like.

S102: The network device parses the first management frame to obtain the device attribute information of the Internet of things device.

S103: The network device transmits the device attribute information of the Internet of things device to a terminal device connected to the network device, the device attribute information of the Internet of things device being for indicating the terminal device to perform verification on validity of the Internet of things device.

In this disclosure, after the first management frame is received, the network device may parse the first management frame according to a frame format of the first management frame, to obtain the device attribute information of the Internet of things device, and transmit the device attribute information of the network device to the terminal device connected to the network device. The terminal device may perform verification on the validity of the Internet of things device according to the device attribute information, to obtain a verification result. The verification result is for reflecting that the Internet of things device is valid, or the verification result is for reflecting that the Internet of things device is invalid. That the Internet of things device is valid may be that the Internet of things device belongs to a user corresponding to the terminal device, for example, that the Internet of things device is valid may be that the Internet of things device is purchased by the user corresponding to the terminal device, or that the Internet of things device is valid may be that a distance between the Internet of things device and the terminal device is less than a device threshold. Similarly, that the Internet of things device is invalid may be that the Internet of things device does not belong to the user corresponding to the terminal device, for example, that the Internet of things device is invalid may be that the Internet of things device is not purchased by the user corresponding to the terminal device, or that the Internet of things device is invalid may be that the distance between the Internet of things device and the terminal device is greater than or equal to the device threshold.

S104: The network device generates a second management frame carrying network attribute information of the network device in a case (e.g., based on a determination) that a target verification result transmitted by the terminal device is received, the target verification result being for indicating that the Internet of things device is valid.

In this disclosure, if the verification result is not the target verification result for indicating that the Internet of things device is valid, it indicates that the Internet of things device is invalid. The network device may suspend generating the second management frame according to the network attribute information of the network device, that is, refuse to perform network distribution on the Internet of things device. In this way, an invalid Internet of things device can be prevented from being connected to the network device, thereby improving security of the network connection. If the network device receives the target verification result that is transmitted by the terminal device and that is for indicating that the Internet of things device is valid, the network device may generate the second management frame according to the network attribute information, where the network attribute information may include a network account and a password corresponding to the network device, and the network account may include one or more of a name set by the user corresponding to the terminal device for the network device, a service set identifier (SSID) of the network device, and the like.

In an example, if the network device receives the target verification result that is transmitted by the terminal device and that is for indicating that the Internet of things device is valid, the network device may generate the second management frame according to a data length and a ciphertext of the network attribute information, for example, directing add the network attribute information of the network device to an initial management frame, to obtain the second management frame; or the network device may encrypt the network attribute information in a password manner, to obtain a ciphertext of the network attribute information, and generate the second management frame according to the ciphertext of the network attribute information, where the initial management frame may be a frame that is for reflecting a frame format of the second management frame and that does not include specific data information. The encryption manner may be one or more of a shared key encryption manner, a message digest algorithm 5 (MD5), a des symmetric encryption (DES) algorithm, and the like.

For example, in a case that the network device encrypts the network attribute information in the shared key encryption manner, S104 includes: obtaining a shared key between the Internet of things device and the network device in a case (e.g., based on a determination) that the target verification result transmitted by the terminal device is received; encrypting the network attribute information of the network device by using the shared key, to obtain a ciphertext of the network attribute information; and generating the second management frame according to the ciphertext of the network attribute information, where the second management frame is further for indicating the Internet of things device to decrypt the ciphertext of the network attribute information in the second management frame, to obtain the network attribute information of the network device.

If the network device receives the target verification result transmitted by the terminal device, it indicates that the network device may obtain the shared key between the Internet of things device and the network device when the Internet of things device is valid, where the shared key may be a key obtained through calculation of each of the network device and the Internet of things device; the network device encrypts the network attribute information by using the shared key, to obtain the ciphertext of the network attribute information; and the Internet of things device decrypts the ciphertext of the network attribute information by using the shared key, to obtain the network attribute information.

Therefore, the network device may encrypt the network attribute information of the network device by using the shared key, to obtain the ciphertext of the network attribute information; and add the ciphertext of the network attribute information to the initial management frame, to obtain the second management frame, where the second management frame is further for indicating the Internet of things device to decrypt the ciphertext of the network attribute information in the second management frame, to obtain the network attribute information of the network device. The network attribute information is encrypted by using the shared key, which can prevent the network attribute information from being obtained by an invalid Internet of things device in a transmission process, thereby improving transmission security of the network attribute information.

In an example, the network device may obtain the shared key between the Internet of things device and the network device in the following manner: obtaining a shared prime between the Internet of things device and the network device in a case (e.g., based on a determination) that the target verification result transmitted by the terminal device is received; obtaining a private key of the network device, and obtaining a public key of the Internet of things device from the device attribute information of the Internet of things device; obtaining a first value according to the public key to the $K^{th}$ power of the Internet of things device, where K is determined according to the private key of the network device; and performing modulo processing on the first value and the shared prime, to obtain the shared key between the Internet of things device and the network device.

If the target verification result transmitted by the terminal device is received, the shared prime between the Internet of things device and the network device is obtained, where the shared prime and a subsequent shared basic integer may be jointly determined by the Internet of things device and the network device and for generating parameters of the shared key. Therefore, the network device may obtain the private key of the network device, and obtain the public key of the Internet of things device from the device attribute information of the Internet of things device; and obtain the first value according to the public key to the $K^{th}$ power of the Internet of things device, where K is determined according to the private key of network device, for example, K may be n times of the private key of the network device, n may be generated according to device attribute information of the network device, and the device attribute information of the network device includes one or more of a device identifier, installed time, purchase time, a quantity of connected Internet of things devices, and the like. Further, modulo processing is performed on the first value and the shared prime, to obtain the shared key between the Internet of things device and the network device. That is to say, on a network device end, the shared key is generated according to the private key of the network device, the public key of the Internet of things device, and the shared prime, and the private key of the network device is owned by only the network device. Therefore, another device cannot obtain the shared key, and cannot decrypt the ciphertext of the network attribute information to obtain the network attribute information. In this way, transmission security of the network attribute information can be improved.

In an example, the generating the second management frame according to the ciphertext of the network attribute information includes: determining a data length in the ciphertext of the network attribute information; and generating the second management frame according to the data length and the ciphertext of the network attribute information.

In an example, the network device may obtain the data length of the ciphertext of the network attribute information, and add the data length and the ciphertext of the network attribute information to a data body of the initial management frame, to obtain the second management frame, where the data length in the second management frame is for indicating the Internet of things device to perform verification whether the ciphertext of the network attribute information is tampered with. In this way, transmission security of the network attribute information can be improved.

For example, in a case (e.g., based on a determination) that the second management frame is received, the Internet of things device may obtain the data length and the ciphertext of the network attribute information from the second management frame, and obtain a final data length of the ciphertext of the network attribute information. If the final data length and the data length in the second management frame are different, it indicates that the ciphertext of the network attribute information is tampered with, and the Internet of things device may discard the ciphertext of the network attribute information. If the final data length and the data length in the second management frame are the same, it indicates that the ciphertext of the network attribute information is not tampered with, and the Internet of things device may decrypt the ciphertext of the network attribute information, to obtain the network attribute information.

In an example, before the network device encrypts the network attribute information by using the shared key, or after the network device encrypts the network attribute information by using the shared key, the network device may transmit the public key of the network device to the Internet of things device in the following manner: obtaining a shared basic integer between the Internet of things device and the network device; obtaining a second value according to the shared basic integer to the $K^{th}$ power; performing modulo processing on the second value and the shared prime, to obtain the public key of the network device; and generating a third management frame carrying the public key of the network device, and transmitting the third management frame to the Internet of things device, where the third management frame is for indicating the Internet of things device to decrypt the ciphertext of the network attribute information in the second management frame according to the private key of the Internet of things device and the public key of the network device in the third management frame, to obtain the network attribute information of the network device.

The network device may obtain the shared basic integer between the Internet of things device and the network device; determine the shared basic integer to the $K^{th}$ power as the second value, where K is determined according to the private key of the network device; further perform modulo processing on the second value and the shared prime, to obtain the public key of the network device; and add the public key of the network device to the initial management frame, to obtain the third management frame carrying the public key of the network device. Then, the third management frame may be transmitted to the Internet of things device. The Internet of things device may generate the shared key according to the public key of the network device, the private key of the Internet of things device, and the shared prime, and decrypt the ciphertext of the network attribute information by using the shared key, to obtain the network attribute information.

S105: The network device transmits the second management frame to the Internet of things device, the second management frame being for indicating the Internet of things device to establish a network connection with the network device based on the network attribute information in the second management frame.

In this disclosure, the network device may transmit the second management frame to the Internet of things device. After the second management frame is received, the Internet of things device may parse the second management frame, to obtain the network attribute information of the network device; and establish the network connection with the network device according to the network attribute information of the network device, that is, the Internet of things device is connected to a network established by the network device. After the Internet of things device establishes the network connection with the network device, the terminal device may communicate with the Internet of things device through the network device, the Internet of things device does not switch between different working modes, and a user does not need to manually input the network attribute information, so that network connection efficiency of the Internet of things device can be improved, in other words, rapid network distribution of the Internet of things device is achieved.

In this disclosure, in a case that an Internet of things device needs to communicate with a terminal device, the Internet of things device may generate a first management frame carrying device attribute information of the Internet of things device, and transmit the first management frame to a network device connected to the terminal device. After the first management frame is received, the network device may transmit the device attribute information of the Internet of things device to the terminal device. In a case (e.g., based on a determination) that the device attribute information of the Internet of things device is received, the terminal device may perform verification on validity of the Internet of things device according to the device attribute information of the Internet of things device, to obtain a verification result, and return the verification result to the network device. In a case (e.g., based on a determination) that the verification result is a target verification result for indicating that the Internet of things device is valid, the network device may generate a second management frame according to network attribute information of the network device, and transmit the second management frame to the Internet of things device. After the second management frame is received, the Internet of things device may establish a network connection with the network device according to the network attribute information. It can be seen that, in a process of performing a network connection with the Internet of things device, the network device transmits the network attribute information in the second management frame to the Internet of things device, and a user does not need to manually input the network attribute information, so that network connection efficiency of the Internet of things device can be improved, in other words, rapid network distribution of the Internet of things device is achieved.

Figure 6:
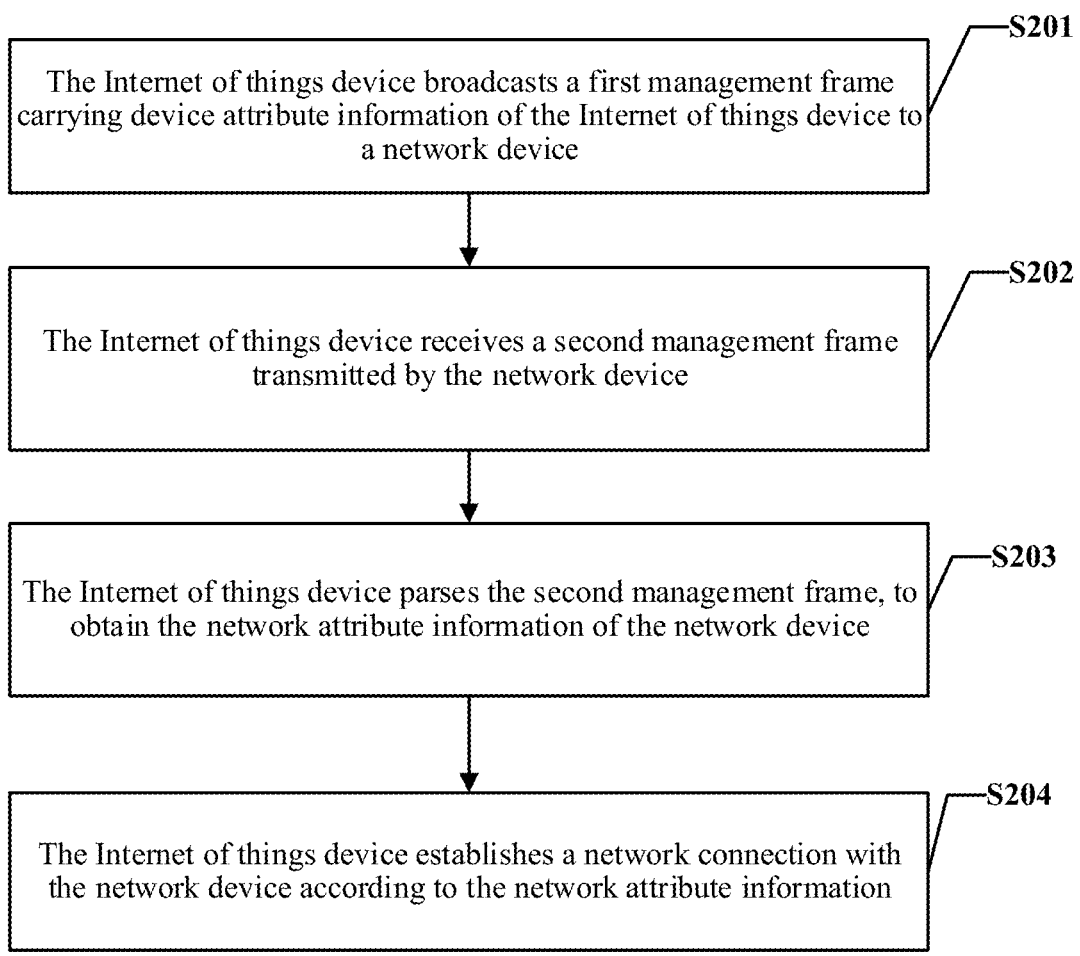
FIG. 6 is a schematic flowchart of a network connection method according to an embodiment of this disclosure.

FIG. 6 is a schematic flowchart of a network connection method according to an embodiment of this disclosure. As shown in FIG. 6, the method may be performed by the Internet of things device in FIG. 1. The network connection method may include the following S201 to S204.

S201: The Internet of things device broadcasts a first management frame carrying device attribute information of the Internet of things device to a network device, the first management frame being for indicating the network device to transmit the device attribute information of the Internet of things device in the first management frame to a terminal device, the device attribute information of the Internet of things device being for indicating the terminal device to perform verification on validity of the Internet of things device, and the terminal device being connected to the network device.

In this disclosure, in a case that the Internet of things device needs to communicate with the terminal device, for example, in a case that the Internet of things device is powered on, or in a case that a network between the Internet of things device and the terminal device is interrupted (in other words, a network connection between the Internet of things device and the network device is interrupted), in a case that the Internet of things device first establishes a network connection with the terminal device (in other words, the Internet of things device first establishes a network connection with the network device), the Internet of things device may add the device attribute information of the Internet of things device to an initial management frame, to obtain the first management frame, and broadcast the first management frame to the network device. The first management frame is for indicating the network device to transmit the device attribute information of the Internet of things device in the first management frame to the terminal device, the device attribute information of the Internet of things device is for indicating the terminal device to perform verification on validity of the Internet of things device, and the terminal device is connected to the network device.

In an example, the Internet of things device generates the first management frame carrying the device attribute information of the Internet of things device in the following manner: obtaining a device identifier of the Internet of things device, and obtaining a shared basic integer between the Internet of things device and the network device; obtaining a fourth value according to the shared basic integer to the $M^{th}$ power; performing modulo processing on the fourth value and the shared prime, to obtain the public key of the Internet of things device; determining the device identifier of the Internet of things device and the public key of the Internet of things device as the device attribute information of the Internet of things device; and generating the first management frame carrying the device attribute information of the Internet of things device according to the network attribute information of the network device.

For example, the Internet of things device may obtain the device identifier of the Internet of things device, and obtain the shared basic integer between the Internet of things device and the network device; and obtain the fourth value according to the shared basic integer to the $M^{th}$ power, where M may be determined according to the private key of the Internet of things device. Further, modulo processing is performed on the fourth value and the shared prime, to obtain the public key of the Internet of things device; the device identifier of the Internet of things device and the public key of the Internet of things device are determined as the device attribute information of the Internet of things device; and the network attribute information of the network device is added to a data body of the initial management frame, to obtain the first management frame carrying the device attribute information of the Internet of things device.

S202: The Internet of things device receives a second management frame transmitted by the network device, the second management frame being generated by the network device according to network attribute information of the network device in a case (e.g., based on a determination) that a target verification result indicating that the Internet of things device is valid is received.

In this disclosure, the Internet of things device may receive the second management frame transmitted by the network device, where the second management frame is generated by the network device according to the network attribute information of the network device in a case (e.g., based on a determination) that the target verification result indicating that the Internet of things device is valid is received. That is to say, in a case that a verification result indicating that the Internet of things device is invalid is received, the network device refuses to perform network distribution on the Internet of things device, that is, refuses to transmit the second management frame to the Internet of things device. In this way, security of the network connection of the Internet of things device.

S203: The Internet of things device parses the second management frame, to obtain the network attribute information of the network device.

In this disclosure, in a case that the second management frame is generated according to the network attribute information of the network device, the Internet of things device may directly obtain the network attribute information of the network device from a data body of the second management frame. In a case (e.g., based on a determination) that the second management frame is generated according to a ciphertext of the network attribute information of the network device, the Internet of things device may obtain the ciphertext of the network attribute information of the network device from the data body of the second management frame, and decrypt the ciphertext of the network attribute information of the network device, to obtain the network attribute information of the network device.

In an example, in a case that the second management frame is generated according to the ciphertext of the network attribute information of the network device and the ciphertext of the network attribute information is obtained by encrypting the network attribute information by using the shared key, the Internet of things device may obtain the network attribute information of the network device in the following manner: obtaining the ciphertext of the network attribute information of the network device from the data body of the second management frame; obtaining the shared key between the Internet of things device and the network device; and decrypting the ciphertext of the network attribute information by using the shared key, to obtain the network attribute information of the network device.

For example, the Internet of things device may obtain the ciphertext of the network attribute information of the network device from the data body of the second management frame; and may further obtain the shared key between the Internet of things device and the network device, where the shared key is a key used by the network device to encrypt the network attribute information of the network device. Therefore, the Internet of things device may decrypt the ciphertext of the network attribute information by using the shared key, to obtain the network attribute information of the network device. In this way, the network attribute information can be prevented from being intercepted by an invalid device, thereby improving transmission security of the network attribute information.

In an example, the Internet of things device may obtain the shared key between the Internet of things device and the network device in the following manner: obtaining a shared prime between the Internet of things device and the network device; obtaining a private key of the Internet of things device, and obtaining a public key of the network device; obtaining a third value according to the public key to the $M^{th}$ power of the network device, where M is determined according to the private key of the Internet of things device; and performing modulo processing on the third value and the shared prime, to obtain the shared key between the Internet of things device and the network device.

For example, the Internet of things device may obtain the shared prime between the Internet of things device and the network device, where the shared prime may be generated by the Internet of things device or the network device according to current time and other parameters. Further, the Internet of things device may obtain the private key of the Internet of things device, and obtains the public key of the network device; and obtains the third value according to the public key to the $M^{th}$ power of the network device, where M is determined according to the private key of the Internet of things device. Then, modulo processing is performed on the third value and the shared prime, to obtain the shared key between the Internet of things device and the network device. That is to say, on an Internet of things device end, the shared key is generated according to the public key of the network device, the private key of the Internet of things device, and the shared prime, and the private key of the Internet of things device is owned by only the Internet of things device. Therefore, another device cannot obtain the shared key, and cannot decrypt the ciphertext of the network attribute information to obtain the network attribute information. In this way, transmission security of the network attribute information can be improved.

In an example, the Internet of things device may obtain the private key of the Internet of things device and obtain the public key of the network device in the following manner: generating a random number according to the device attribute information of the Internet of things device, and determining the random number as the private key of the Internet of things device; receiving a third management frame transmitted by the network device; and parsing the third management frame, to obtain the public key of the network device.

For example, the Internet of things device may calculate the device attribute information of the Internet of things device by using a random algorithm to obtain the random number, determine the random number as the private key of the Internet of things device, receive the third management frame transmitted by the network device, and obtains the public key of the network device from a data body of the third management frame.

Figure 7:
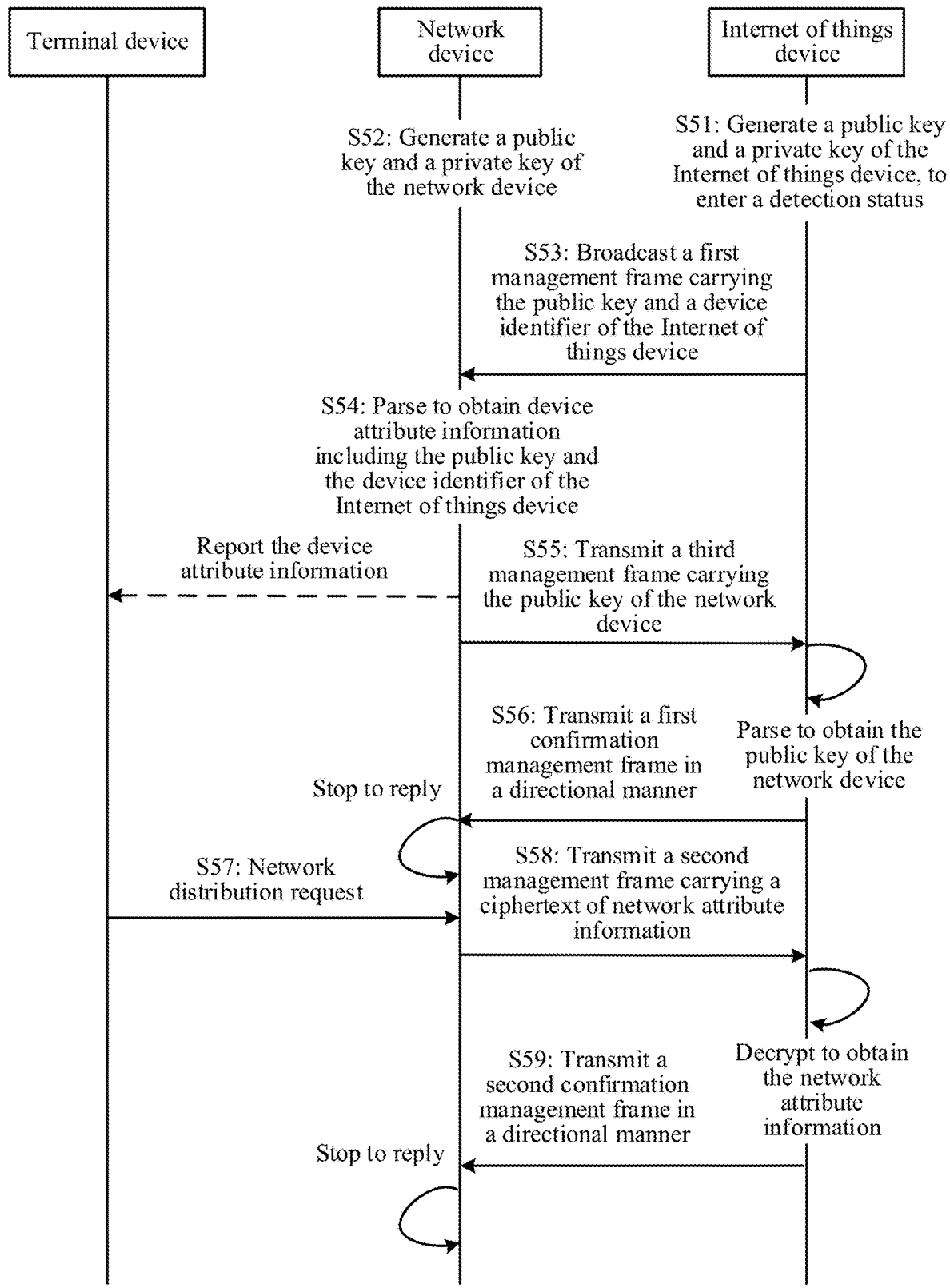
FIG. 7 is a schematic diagram of an interaction scenario among various devices in a network connection system according to an embodiment of this disclosure.

FIG. 7 is a schematic diagram of an interaction scenario among various devices in a network connection system according to this disclosure. For example, a process of public key exchange between a network device and an Internet of things device is shown in FIG. 7. The process may include the following S51 to S59.

S51: The Internet of things device may generate a public key and a private key of the Internet of things device, to enter a detection status. In a case that the Internet of things device needs to establish a network connection with the network device, the Internet of things device may enter a network distribution mode, where the network distribution mode may be a station mode; obtain a shared prime and a shared basic integer between the network device and the Internet of things device, to generate a random number of the Internet of things device; use the random number of the Internet of things device as the private key of the Internet of things device; obtain a fourth value according to the shared basic integer to the $M^{th}$ power, where M is determined according to the private key of the Internet of things device; and perform modulo processing on the fourth value and the shared prime, to obtain the public key of the Internet of things device. After the public key of the private key of the Internet of things device are obtained, the Internet of things device may enter the detection status, to receive a management frame transmitted by the network device.

S52: The network device generates a public key and a private key of the network device. Similarly, the network device may obtain the shared prime and the shared basic integer between the network device and the Internet of things device, to generate a random number of the network device; use the random number of the network device as the private key of the network device; obtain a second value according to the shared basic integer to the $K^{th}$ power; and perform modulo processing on the second value and the shared prime, to obtain the public key of the network device.

S53: The Internet of things device broadcasts a first management frame carrying a device identifier and the public key of the Internet of things device to the network device. Further, the Internet of things device may use the device identifier and the public key of the Internet of things device as device attribute information of the Internet of things device, generate the first management frame carrying the device attribute information, and broadcast the first management frame to the network device.

S54: The network device parses the first management frame, to obtain the device identifier of the Internet of things device and the public key of the Internet of things device. After the first management frame is received, the network device may parse the first management frame, to obtain the device identifier of the Internet of things device and the public key of the Internet of things device. The network device may transmit the device identifier of the Internet of things device to a terminal device.

S55: The network device transmits a third management frame carrying the public key of the network device to the Internet of things device. After the public key and the private key of the network device are generated, the network device may generate the third management frame carrying the public key of the network device, and transmit the third management frame to the Internet of things device, to implement public key exchange between the network device and the Internet of things device.

S56: The Internet of things device transmits a first confirmation management frame to the network device. After the third management frame is received, the Internet of things device may transmit the first confirmation management frame to the network device, that is, transmit a first confirmation message to the network device, where the first confirmation message is for indicating that the Internet of things device receives the third management frame carrying the public key of the network device. In this case, the network device does not need to reply to the first confirmation management frame.

S57: The terminal device transmits a network distribution request to the network device. After the device identifier transmitted by the network device is received, the terminal device may perform verification on validity of the Internet of things device according to the device identifier of the Internet of things device, to obtain a verification result, and transmit the verification result to the network device.

S58: The network device transmits a second management frame carrying a ciphertext of network attribute information to the Internet of things device. In a case (e.g., based on a determination) that a target verification result for indicating that the Internet of things device is valid is received, the network device may encrypt the network attribute information of the network device according to the private key of the network device, the public key of the Internet of things device, and the shared basic integer, to obtain the ciphertext of the network attribute information; generate the second management frame carrying the ciphertext of the network attribute information; and transmit the second management frame to the Internet of things device.

S59: The Internet of things device transmits a second confirmation management frame to the network device. After the second management frame is received, the Internet of things device may parse the second management frame, to obtain the ciphertext of the network attribute information; decrypt the ciphertext of the network attribute information, to obtain the network attribute information; and transmit the second confirmation management frame to the network device, where the second confirmation management frame is for notifying the network device that the Internet of things device has received the network attribute information. In this case, the network device does not need to reply to the second confirmation management frame. Further, the Internet of things device may establish a network connection between the network device and the Internet of things device according to the network attribute information, so that communication between the Internet of things device and the terminal device can be implemented.

Figure 8:
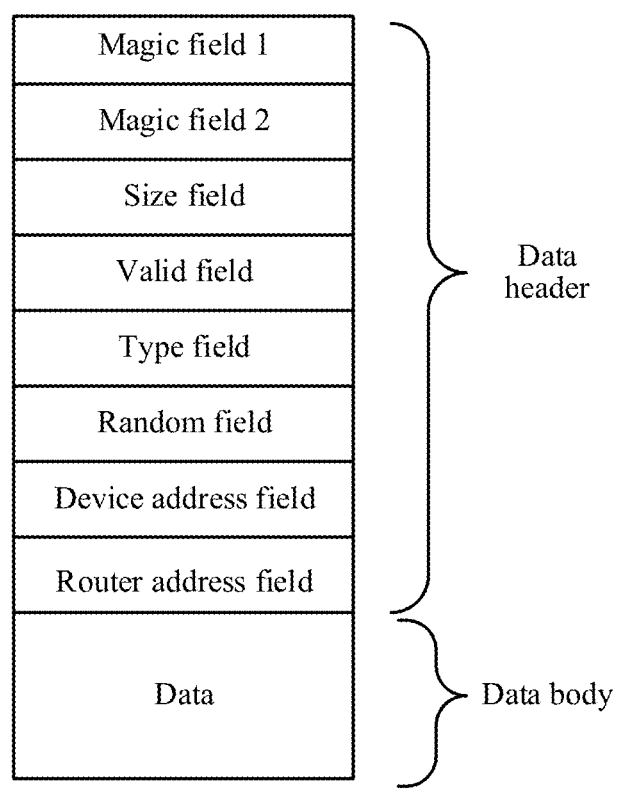
FIG. 8 is a schematic diagram of a frame form of an initial management frame according to an embodiment of this disclosure.

FIG. 8 is a schematic diagram of a frame form of an initial management frame according to this disclosure. FIG. 8 illustrates an example frame format of an initial management frame, but other frame forms may be implemented according to the disclosure (e.g., varying in bit size, format, structure). The initial management frame includes a data header and a data body. The data header includes a magic byte 1 (magic1), a magic byte 2 (magic2), a size field (size), a valid field (crc32), a type field (type), a random field (stamp), a device address field (device addr), and a router address field (router addr). magic1 and magic2 have 8 magic bytes in total, for determining validity of a management frame or positioning a location of data. size has 4 bytes, indicating a size of subsequent data (bytes after crc32). crc32 has 4 bytes, for identifying completeness and validity of the subsequent data (bytes after crc32). type has 4 bytes, for identifying a type of a management frame for interaction between the Internet of things device and the network device (for example, a router). Different definitions exist in the data according to different types. stamp has 4 bytes, random bytes. Because one probe request can obtain only one probe response, stamp is for determining repetition of the management frame for code. device addr has 6 bytes, being a mac address (device identifier) of the Internet of things device. router addr has 6 bytes, being a mac address of a peer end (the router). data body (data) has different definitions according to different types.

For example, when the Internet of things device is powered on, a management frame of type RR_CONTENT_TYPE_IOT_UP (namely, the first management frame) is transmitted. Data in the management frame is defined in Table 1 below:

TABLE 1

```
struct {
    __le32 vid;
    __le32 pid;
    __le32 type;
    __u8 pubkey[RR_PUB_KEY_SIZE];
} iot;
``` vid and pid in Table 1 are the device identifier of the Internet of things device, that is, a supplier ID and a product identifier ID respectively. pubkey indicates the public key of the Internet of things device.

After the management frame of the type RR_CONTENT_TYPE_IOT_UP is received by the router, the router determines that the Internet of Things device is powered on, parses and stores the data in the first management frame to the router, and replies with a third management frame of type RR_CONTENT_TYPE_ROUTER_PUBKEY. Data in the third management frame is defined in Table 2 below:

TABLE 2

```
struct {
    __le32 freq;
    __le32 rssi;
    __u8 pubkey[RR_PUB KEY_SIZE];
} router_s1;
```

In Table 2, freq, rssi, and pubkey respectively indicate a signal band of the network device, signal strength, and the public key of the network device.

After the third management frame of the RR_CONTENT_TYPE_ROUTER_PUBKEY type is received by the Internet of things device, the Internet of things device determines to receive a reply of the router, parses the data in the third management frame, sets a network parameter according to the data, and replies with a first confirmation management frame of type RR_CONTENT_TYPE_ROUTER_PUBKEY_ACK, where the first confirmation management frame is for notifying the network device that the Internet of things device has received the third management frame carrying the public key of the network device. The type of the first confirmation management frame is RR_CONTENT_TYPE_ROUTER_PUBKEY_ACK, and a data body is empty. After the router receives the first confirmation management frame of RR_CONTENT_TYPE_ROUTER_PUBKEY_ACK, interaction of a first stage is completed. The router may transmit a second management frame of type RR_CONTENT_TYPE_ROUTERS_SSID to the Internet of things device. A data body in the second management frame is shown in Table 3 below:

TABLE 3

```
struct {
    le16 encrypt_len;
    u8 encrypt_data[0];
} router_s2;
``` encrypt_data and encrypt_len in Table 3 respectively indicate the ciphertext of the network attribute information and a length of the ciphertext of the network attribute information. After the second management frame of the type RR_CONTENT_TYPE_ROUTER_SSID is received by the Internet of things device, the Internet of things device parses data inside, and then replies with a second confirmation management frame of type RR_CONTENT_TYPE_ROUTER_SSID_ACK. The second confirmation management frame is for notifying the network device that the Internet of things device has received the network attribute information of the network device. The entire interaction process ends. The type of the second confirmation management frame is RR_CONTENT_TYPE_ROUTER_SSID_ACK, and a data body is empty.

S204: The Internet of things device establishes a network connection with the network device according to the network attribute information.

In this disclosure, the Internet of things device may be connected to a network established by the network device according to the network attribute information, to complete the network connection between the network device and the Internet of things device, so that the terminal device can communicate with the Internet of things device through the network device.

In this disclosure, in a case that an Internet of things device needs to communicate with a terminal device, the Internet of things device may generate a first management frame carrying device attribute information of the Internet of things device, and transmit the first management frame to a network device connected to the terminal device. After the first management frame is received, the network device may transmit the device attribute information of the Internet of things device to the terminal device. In a case (e.g., based on a determination) that the device attribute information of the Internet of things device is received, the terminal device may perform verification on validity of the Internet of things device according to the device attribute information of the Internet of things device, to obtain a verification result, and return the verification result to the network device. In a case (e.g., based on a determination) that the verification result is a target verification result for indicating that the Internet of things device is valid, the network device may generate a second management frame according to network attribute information of the network device, and transmit the second management frame to the Internet of things device. After the second management frame is received, the Internet of things device may establish a network connection with the network device according to the network attribute information. It can be seen that, in a process of performing a network connection with the Internet of things device, the network device transmits the network attribute information in the second management frame to the Internet of things device, and a user does not need to manually input the network attribute information, so that network connection efficiency of the Internet of things device can be improved, in other words, rapid network distribution of the Internet of things device is achieved.

Figure 9:
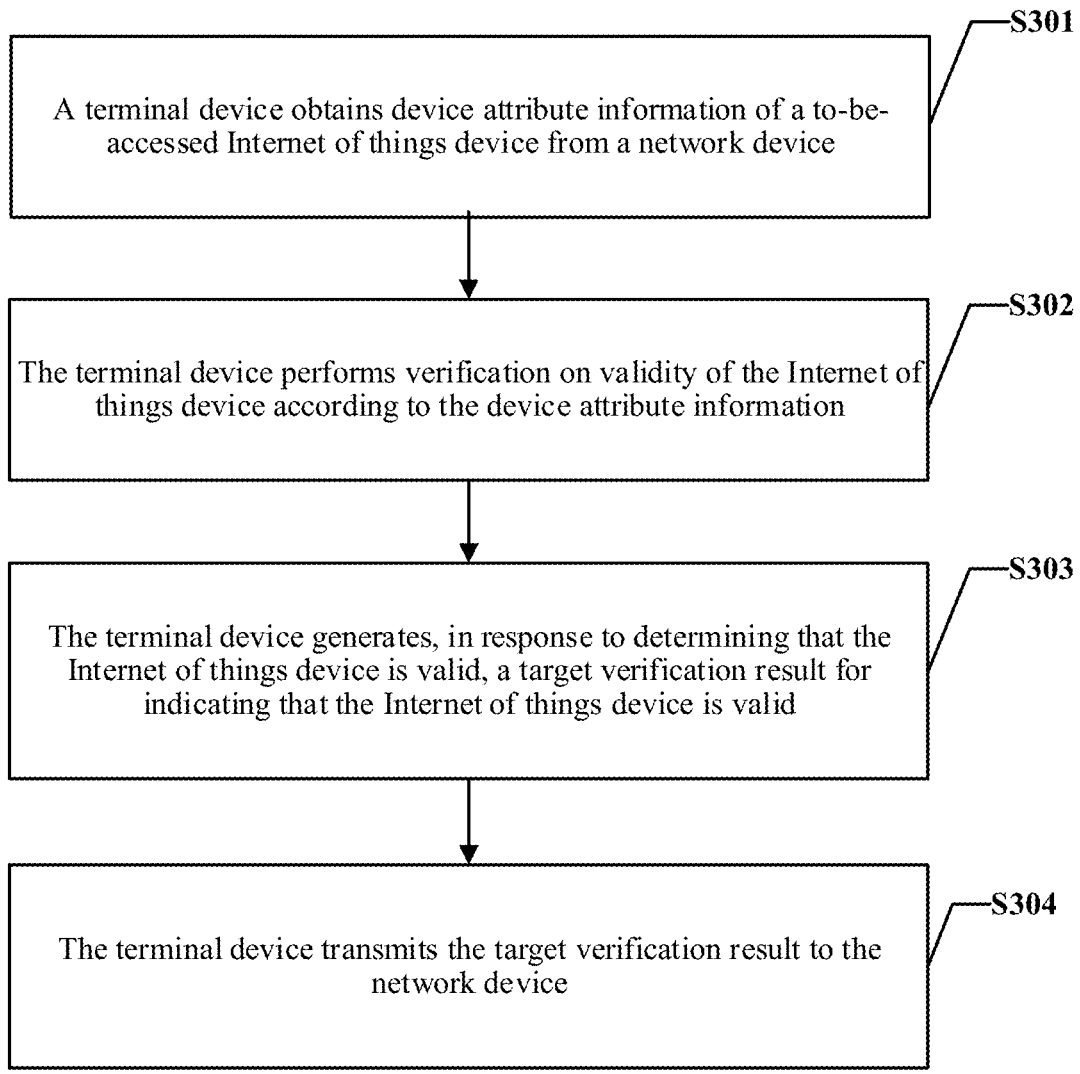
FIG. 9 is a schematic flowchart of a network connection method according to an embodiment of this disclosure.

FIG. 9 is a schematic flowchart of a network connection method according to an embodiment of this disclosure. As shown in FIG. 9, the method may be performed by the Internet of things device in FIG. 1. The network connection method may include the following S301 to S304.

S301: A terminal device obtains device attribute information of a to-be-accessed Internet of things device from a network device, the device attribute information being obtained by the Internet of things device by parsing a first management frame transmitted by the Internet of things device.

S302: The terminal device performs verification on validity of the Internet of things device according to the device attribute information.

S303: The terminal device generates, in response to determining that the Internet of things device is valid, a target verification result for indicating that the Internet of things device is valid.

In S301 through S303, the terminal device may obtain the device attribute information of the to-be-accessed Internet of things device from the network device; perform verification on the validity of the Internet of things device according to the device attribute information; generate, in a case (e.g., based on a determination) that the Internet of things device is invalid, a verification result for indicating that the Internet of things device is invalid; and transmit the verification result for indicating that the Internet of things device is invalid to the network device, to indicate the network device to refuse to establish a network connection with the Internet of things device. In response to determining that the Internet of things device is valid, a target verification result for indicating that the Internet of things device is valid is generated, and S203 is performed.

In an example, the terminal device may perform verification on the validity of the Internet of things device in any verification manner or more combinations of verification manners in the following verification manners.

Verification manner 1: Obtain terminal attribute information of the terminal device, and obtain, from a blockchain network, a node device that does not have an association relationship with the terminal attribute information of the terminal device as a consensus node device; transmit the device attribute information of the Internet of things device to the consensus node device, where the device attribute information of the Internet of things device is for indicating the consensus node device to perform verification on the validity of the Internet of things device; and generate, in a case (e.g., based on a determination) that a candidate verification result indicating that the verification performed on the consensus node device on the Internet of things device succeeds is received, the target verification result for indicating that the Internet of things device is valid.

In Verification manner 1, the terminal device may obtain the terminal attribute information of the terminal device, where the terminal attribute information includes one or more of location information of the terminal device, a terminal identifier of the terminal device, user information corresponding to a user to which the terminal device belongs, and the like. The terminal device may obtain, from the blockchain network, the node device that does not have the association relationship with the terminal attribute information of the terminal device as the consensus node device; and transmit the device attribute information of the Internet of things device to the consensus node device. The consensus node device may perform verification on the validity of the Internet of things device according to the device attribute information, to obtain the verification result, and transmit the verification result to the terminal device. In a case (e.g., based on a determination) that a candidate verification result indicating that the verification performed on the consensus node device on the Internet of things device succeeds is received, the terminal device generates the target verification result for indicating that the Internet of things device is valid. For example, in a case that candidate verification results indicating that more than 50% of consensus node devices verify that the Internet of things device is valid are received, the terminal device generates the target verification result for indicating that the Internet of things device is valid. By performing verification on the validity of the Internet of things device based on the consensus node device in the blockchain network, because the consensus node device is not associated with the terminal attribute information of the terminal device, fairness and accuracy of the verification on the validity of the Internet of things device can be ensured, thereby further helping improve security of the network connection of the Internet of things device.

Further, the generating, in a case (e.g., based on a determination) that a candidate verification result indicating that the verification performed on the consensus node device on the Internet of things device succeeds is received, the target verification result for indicating that the Internet of things device is valid includes: counting a quantity of devices whose transmitted candidate verification results are that the verification succeeds in the consensus node device, and a total quantity of devices in the consensus node device; determining a verification success rate of the Internet of things device according to the quantity of devices and the total quantity of devices; and determining, in a case (e.g., based on a determination) that the verification success rate of the Internet of things device is greater than or equal to a verification success rate threshold, that the Internet of things device is valid, and generating the target verification result for indicating that the Internet of things device is valid.

The terminal device may count the quantity of devices whose transmitted candidate verification results are that the verification succeeds in the consensus node device, and the total quantity of devices in the consensus node device; and determine a ratio of the quantity of devices to the total quantity of devices as the verification success rate of the Internet of things device. In a case (e.g., based on a determination) that the verification success rate of the Internet of things device is less than the verification success rate threshold, it indicates that candidate verification results transmitted by most consensus node devices are verification results in which the verification is unsuccessful, in other words, in a case (e.g., based on a determination) that most consensus node devices determine that the Internet of things device is invalid, it is determined that the Internet of things device has not validity, and a verification result for indicating that the Internet of things device is invalid is generated. In a case (e.g., based on a determination) that the verification success rate of the Internet of things device is greater than or equal to the verification success rate threshold, it is determined that the Internet of things device is valid, and the target verification result for indicating that the Internet of things device is valid is generated. By performing verification on the validity of the Internet of things device based on the consensus node device in the blockchain network, namely, by determining a verification result for the validity of the Internet of things device by counting verification results of a plurality of consensus node devices, an error in a verification process of a single device can be avoided, thereby improving accuracy of the verification on the validity of the Internet of things device.

Verification manner 2: Invoke a validity detection component, to obtain a device identifier set corresponding to the Internet of things device associated with the terminal device; and determine, in a case that the device identifier of the Internet of things device belongs to the device identifier set, that the Internet of things device is valid, and generate the target verification result for indicating that the Internet of things device is valid.

The terminal device may invoke the validity detection component, where the validity detection component may be an application program interface that has been installed on the terminal device and that may be used for performing verification on the validity of the Internet of things device, for example, the application program interface may be a social application program, a shopping application program, and the like. Further, the device identifier set corresponding to the Internet of things device associated with the terminal device may be obtained, where the device identifier set may be a device identifier set corresponding to an Internet of things device associated between terminal devices, for example, the device identifier set includes a device identifier of an Internet of things device purchased by a user corresponding to the terminal device, or the device identifier set includes a device identifier of an Internet of things device added by the user corresponding to the terminal device. Therefore, in a case that the device identifier of the Internet of things device does not belong to the device identifier set, it is determined that the Internet of things device is invalid, and a target verification result for indicating that the Internet of things device is invalid is generated. In a case that the device identifier of the Internet of things device belongs to the device identifier set, it is determined that the Internet of things device is valid, and the target verification result for indicating that the Internet of things device is valid is generated. In this way, an invalid Internet of things device can be prevented from being connected to the network device, thereby improving security of the network connection of the Internet of things device.

Verification manner 3: The device attribute information includes location information of the Internet of things device; obtain location information of the network device, and determine a distance between the Internet of things device and the network device according to the location information of the Internet of things device and the location information of the network device; and determine, in a case that the distance is less than a distance threshold, that the Internet of things device is valid, and generate a target verification result for indicating that the Internet of things device is valid.

The terminal device may obtain the location information of the network device, and determine the distance between the Internet of things device and the network device according to the location information of the Internet of things device and the location information of the network device. If the distance between the Internet of things device and the network device is too large, it indicates that the Internet of things device and the network device does not belong to a same user. Therefore, in a case (e.g., based on a determination) that the distance is less than the distance threshold, it is determined that the Internet of things device is valid, and the target verification result for indicating that the Internet of things device is valid is generated. By performing verification on the validity of the Internet of things device based on a location of the Internet of things device, security of the network connection of the Internet of things device is improved.

S304: The terminal device transmits the target verification result to the network device, the target verification result being for indicating the network device to transmit a second management frame to the Internet of things device, the second management frame carrying network attribute information of the network device, and the second management frame being for indicating the Internet of things device to establish a network connection with the network device based on the network attribute information in the second management frame.

In this disclosure, in a case that an Internet of things device needs to communicate with a terminal device, the Internet of things device may generate a first management frame carrying device attribute information of the Internet of things device, and transmit the first management frame to a network device connected to the terminal device. After the first management frame is received, the network device may transmit the device attribute information of the Internet of things device to the terminal device. In a case (e.g., based on a determination) that the device attribute information of the Internet of things device is received, the terminal device may perform verification on validity of the Internet of things device according to the device attribute information of the Internet of things device, to obtain a verification result, and return the verification result to the network device. In a case (e.g., based on a determination) that the verification result is a target verification result for indicating that the Internet of things device is valid, the network device may generate a second management frame according to network attribute information of the network device, and transmit the second management frame to the Internet of things device. After the second management frame is received, the Internet of things device may establish a network connection with the network device according to the network attribute information. It can be seen that, in a process of performing a network connection with the Internet of things device, the network device transmits the network attribute information in the second management frame to the Internet of things device, and a user does not need to manually input the network attribute information, so that network connection efficiency of the Internet of things device can be improved, in other words, rapid network distribution of the Internet of things device is achieved.

Figure 10:
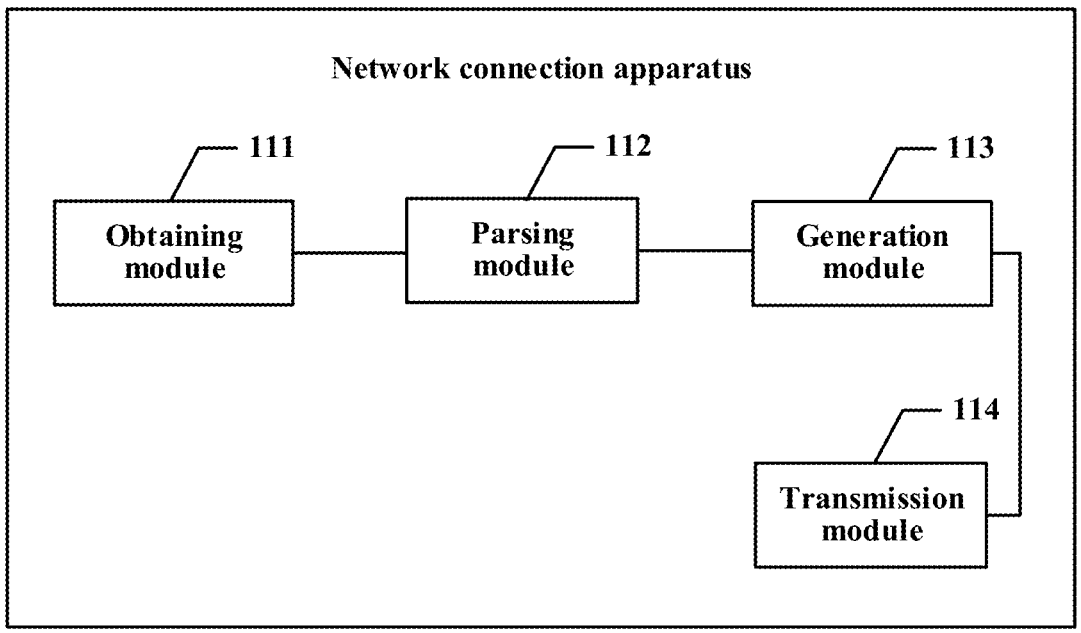
FIG. 10 is a schematic structural diagram of a network connection apparatus according to an embodiment of this disclosure.

FIG. 10 is a schematic structural diagram of a network connection apparatus according to an embodiment of this disclosure. The network connection apparatus may be a computer program (including program code) running in a network device, for example, the network connection apparatus is application software. The apparatus may be configured to perform corresponding steps in the method provided in the embodiments of this disclosure. As shown in FIG. 10, the network connection apparatus may include: an obtaining module 111, a parsing module 112, a generation module 113, and a transmission module 114.

The obtaining module may be configured to obtain a first management frame for performing a network connection from a to-be-accessed Internet of things device.

The parsing module may be configured to parse the first management frame to obtain device attribute information of the Internet of things device, and transmit the device attribute information of the Internet of things device to a terminal device connected to a network device, the device attribute information of the Internet of things device being for indicating the terminal device to perform verification on validity of the Internet of things device.

The generation module may be configured to generate a second management frame carrying network attribute information of the network device in a case (e.g., based on a determination) that a target verification result transmitted by the terminal device is received, the target verification result being for indicating that the Internet of things device is valid.

The transmission module may be configured to transmit the second management frame to the Internet of things device, the second management frame being for indicating the Internet of things device to establish a network connection with the network device based on the network attribute information in the second management frame.

In an example, the generation module may further be configured to:
   obtain a shared key between the Internet of things device and the network device; and
   encrypt the network attribute information of the network device by using the shared key, to obtain a ciphertext of the network attribute information; and
   generate the second management frame according to the ciphertext of the network attribute information, where the second management frame is further for indicating the Internet of things device to decrypt the ciphertext of the network attribute information in the second management frame, to obtain the network attribute information of the network device.

In an example, the generation module may further be configured to:
   obtain a shared prime between the Internet of things device and the network device in a case (e.g., based on a determination) that the target verification result transmitted by the terminal device is received;
   obtain a private key of the network device, and obtain a public key of the Internet of things device from the device attribute information of the Internet of things device;
   obtain a first value according to the public key to the $K^{th}$ power of the Internet of things device, where K is determined according to the private key of the network device; and
   perform modulo processing on the first value and the shared prime, to obtain the shared key between the Internet of things device and the network device.

In an example, the generation module may further be configured to:
   determine a data length in the ciphertext of the network attribute information; and
   generate the second management frame according to the data length and the ciphertext of the network attribute information.

In an example, the network connection apparatus may further include the transmission module, configured to obtain a shared basic integer between the Internet of things device and the network device; obtain a second value according to the shared basic integer to the $K^{th}$ power; perform modulo processing on the second value and the shared prime, to obtain the public key of the network device; and generate a third management frame carrying the public key of the network device, and transmit the third management frame to the Internet of things device, where the third management frame is for indicating the Internet of things device to decrypt the ciphertext of the network attribute information in the second management frame according to the private key of the Internet of things device and the public key of the network device in the third management frame, to obtain the network attribute information of the network device.

According to an embodiment of this disclosure, the steps involved in the network connection method shown in FIG. 5 may be performed by the modules of the network connection apparatus shown in FIG. 10. For example, S101 shown in FIG. 5 may be performed by the obtaining module 111 in FIG. 10; S102 and S103 shown in FIG. 5 may be performed by the parsing module 112 in FIG. 10; S104 shown in FIG. 5 may be performed by the generation module 113 in FIG. 10; and S105 shown in FIG. 5 may be performed by the transmission module 114 in FIG. 10.

According to an embodiment of this disclosure, the modules of the network connection apparatus shown in FIG. 10 may be separately or wholly combined into one or several other units, or one (or more) of the units herein may further be divided into at least two subunits of smaller functions. In this way, same operations may be implemented, and the implementation of the technical effects of the embodiments of this disclosure is not affected. The foregoing modules are divided based on logical functions. In an actual application, a function of one module may also be implemented by at least two units, or functions of at least two modules are implemented by one unit. In other embodiments of this disclosure, the network connection apparatus may also include another unit. In an actual application, these functions may also be cooperatively implemented by another unit and may be cooperatively implemented by at least two units.

According to an embodiment of this disclosure, a computer program (including program code) that can perform the steps in the corresponding methods shown in FIG. 5 may be run on a general computer device, such as a computer, which include processing elements and storage elements such as a central processing unit (CPU), a random access memory (RAM), and a read-only memory (ROM), to construct the network connection apparatus shown in FIG. 10, and implement the network connection method in the embodiments of this disclosure. The computer program may be recorded in, for example, a computer-readable recording medium, and may be loaded into the foregoing computing device by using the computer-readable recording medium, and run on the computing device.

In this disclosure, in a case that an Internet of things device needs to communicate with a terminal device, the Internet of things device may generate a first management frame carrying device attribute information of the Internet of things device, and transmit the first management frame to a network device connected to the terminal device. After the first management frame is received, the network device may transmit the device attribute information of the Internet of things device to the terminal device. In a case (e.g., based on a determination) that the device attribute information of the Internet of things device is received, the terminal device may perform verification on validity of the Internet of things device according to the device attribute information of the Internet of things device, to obtain a verification result, and return the verification result to the network device. In a case (e.g., based on a determination) that the verification result is a target verification result for indicating that the Internet of things device is valid, the network device may generate a second management frame according to network attribute information of the network device, and transmit the second management frame to the Internet of things device. After the second management frame is received, the Internet of things device may establish a network connection with the network device according to the network attribute information. It can be seen that, in a process of performing a network connection with the Internet of things device, the network device transmits the network attribute information in the second management frame to the Internet of things device, and a user does not need to manually input the network attribute information, so that network connection efficiency of the Internet of things device can be improved, in other words, rapid network distribution of the Internet of things device is achieved.

Figure 11:
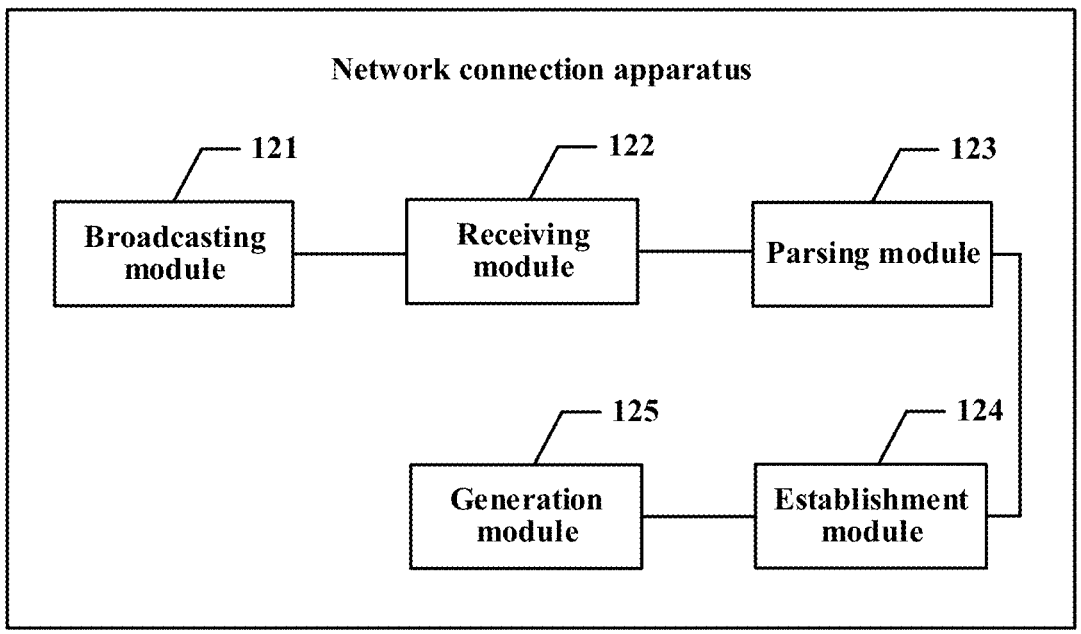
FIG. 11 is a schematic structural diagram of a network connection apparatus according to an embodiment of this disclosure.

FIG. 11 is a schematic structural diagram of a network connection apparatus according to an embodiment of this disclosure. The network connection apparatus may be a computer program (including program code) running in an Internet of things device, for example, the network connection apparatus is application software. The apparatus may be configured to perform corresponding steps in the method provided in the embodiments of this disclosure. As shown in FIG. 11, the network connection apparatus may include: a broadcasting module 121, a receiving module 122, a parsing module 123, an establishment module 124, and a generation module 125.

The broadcasting module may be configured to broadcast a first management frame carrying device attribute information of an Internet of things device to a network device, the first management frame being for indicating the network device to transmit the device attribute information of the Internet of things device in the first management frame to a terminal device, the device attribute information of the Internet of things device being for indicating the terminal device to perform verification on validity of the Internet of things device, and the terminal device being connected to the network device.

The receiving module may be configured to receive a second management frame transmitted by the network device, the second management frame being generated by the network device according to network attribute information of the network device in a case (e.g., based on a determination) that a target verification result indicating that the Internet of things device is valid is received.

The parsing module may be configured to parse the second management frame, to obtain the network attribute information of the network device.

The establishment module may be configured to establish a network connection with the network device according to the network attribute information.

In an example, that the parsing module parses the second management frame, to obtain the network attribute information of the network device includes:
  obtaining a ciphertext of the network attribute information of the network device from a data body of the second management frame;
  obtaining a shared key between the Internet of things device and the network device; and
  decrypting the ciphertext of the network attribute information by using the shared key, to obtain the network attribute information of the network device.

In an example, that the parsing module obtains the shared key between the Internet of things device and the network device includes:
  obtaining a shared prime between the Internet of things device and the network device;
  obtaining a private key of the Internet of things device, and obtaining a public key of the network device;
  obtaining a third value according to the public key to the $M^{th}$ power of the network device, where M is determined according to the private key of the Internet of things device; and
  performing modulo processing on the third value and the shared prime, to obtain the shared key between the Internet of things device and the network device.

In an example, that the parsing module obtains a private key of the Internet of things device, and obtains the public key of the network device includes:

generating a random number according to the device attribute information of the Internet of things device, and determining the random number as the private key of the Internet of things device;

receiving a third management frame transmitted by the network device; and parsing the third management frame, to obtain the public key of the network device.

The generation module is configured to obtain a device identifier of the Internet of things device, and obtain a shared basic integer between the Internet of things device and the network device; obtain a fourth value according to the shared basic integer to the $M^{th}$ power; perform modulo processing on the fourth value and the shared prime, to obtain the public key of the Internet of things device; determine the device identifier of the Internet of things device and the public key of the Internet of things device as the device attribute information of the Internet of things device; and generate the first management frame carrying the device attribute information of the Internet of things device according to the network attribute information of the network device.

In this disclosure, in a case that an Internet of things device needs to communicate with a terminal device, the Internet of things device may generate a first management frame carrying device attribute information of the Internet of things device, and transmit the first management frame to a network device connected to the terminal device. After the first management frame is received, the network device may transmit the device attribute information of the Internet of things device to the terminal device. In a case (e.g., based on a determination) that the device attribute information of the Internet of things device is received, the terminal device may perform verification on validity of the Internet of things device according to the device attribute information of the Internet of things device, to obtain a verification result, and return the verification result to the network device. In a case (e.g., based on a determination) that the verification result is a target verification result for indicating that the Internet of things device is valid, the network device may generate a second management frame according to network attribute information of the network device, and transmit the second management frame to the Internet of things device. After the second management frame is received, the Internet of things device may establish a network connection with the network device according to the network attribute information. It can be seen that, in a process of performing a network connection with the Internet of things device, the network device transmits the network attribute information in the second management frame to the Internet of things device, and a user does not need to manually input the network attribute information, so that network connection efficiency of the Internet of things device can be improved, in other words, rapid network distribution of the Internet of things device is achieved.

Figure 12:
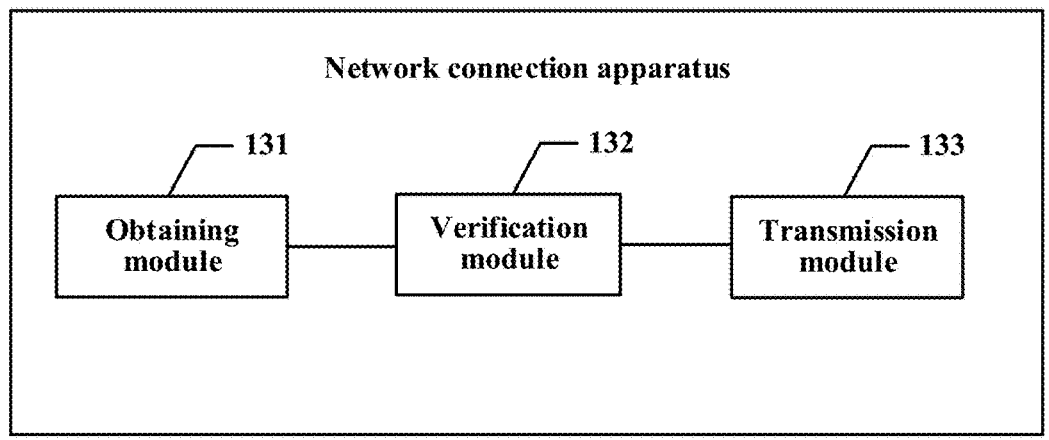
FIG. 12 is a schematic structural diagram of a network connection apparatus according to an embodiment of this disclosure.

FIG. 12 is a schematic structural diagram of a network connection apparatus according to an embodiment of this disclosure. The network connection apparatus may be a computer program (including program code) running in an Internet of things device, for example, the network connection apparatus is application software. The apparatus may be configured to perform corresponding steps in the method provided in the embodiments of this disclosure. As shown in FIG. 12, the network connection apparatus includes: an obtaining module 131, a verification module 132, and a transmission module 133.

The obtaining module is configured to obtain device attribute information of a to-be-accessed Internet of things device from a network device, the device attribute information being obtained by the Internet of things device by parsing a first management frame transmitted by the Internet of things device.

The verification module is configured to perform verification on validity of the Internet of things device according to the device attribute information, and generate, in response to determining that the Internet of things device is valid, a target verification result for indicating that the Internet of things device is valid.

The transmission module is configured to transmit the target verification result to the network device, the target verification result being for indicating the network device to transmit a second management frame to the Internet of things device, the second management frame carrying network attribute information of the network device, and the second management frame being for indicating the Internet of things device to establish a network connection with the network device based on the network attribute information in the second management frame.

In an example, the verification module is further configured to:

obtain terminal attribute information of the terminal device;

obtain, from a blockchain network, a node device that does not have an association relationship with the terminal attribute information of the terminal device as a consensus node device;

transmit the device attribute information of the Internet of things device to the consensus node device, where the device attribute information of the Internet of things device is for indicating the consensus node device to perform verification on the validity of the Internet of things device; and generate, in a case (e.g., based on a determination) that a candidate verification result indicating that the verification performed on the consensus node device on the Internet of things device succeeds is received, the target verification result for indicating that the Internet of things device is valid.

In an example, the verification module is further configured to:

count a quantity of devices whose transmitted candidate verification results are that the verification succeeds in the consensus node device, and a total quantity of devices in the consensus node device;

determine a verification success rate of the Internet of things device according to the quantity of devices and the total quantity of devices; and determine, in a case (e.g., based on a determination) that the verification success rate of the Internet of things device is greater than or equal to a verification success rate threshold, that the Internet of things device is valid, and generating the target verification result for indicating that the Internet of things device is valid.

In an example, the device attribute information includes a device identifier of the Internet of things device; and the verification module is further configured to:

invoke a validity detection component, to obtain a device identifier set corresponding to the Internet of things device associated with the terminal device; and determine, in a case (e.g., based on a determination) that the device identifier of the Internet of things device belongs to the device identifier set, that the Internet of things device is valid, and generate the target verification result for indicating that the Internet of things device is valid.

In this disclosure, in a case that an Internet of things device needs to communicate with a terminal device, the Internet of things device may generate a first management frame carrying device attribute information of the Internet of things device, and transmit the first management frame to a network device connected to the terminal device. After the first management frame is received, the network device may transmit the device attribute information of the Internet of things device to the terminal device. In a case (e.g., based on a determination) that the device attribute information of the Internet of things device is received, the terminal device may perform verification on validity of the Internet of things device according to the device attribute information of the Internet of things device, to obtain a verification result, and return the verification result to the network device. In a case (e.g., based on a determination) that the verification result is a target verification result for indicating that the Internet of things device is valid, the network device may generate a second management frame according to network attribute information of the network device, and transmit the second management frame to the Internet of things device. After the second management frame is received, the Internet of things device may establish a network connection with the network device according to the network attribute information. It can be seen that, in a process of performing a network connection with the Internet of things device, the network device transmits the network attribute information in the second management frame to the Internet of things device, and a user does not need to manually input the network attribute information, so that network connection efficiency of the Internet of things device can be improved, in other words, rapid network distribution of the Internet of things device is achieved.

Figure 13:
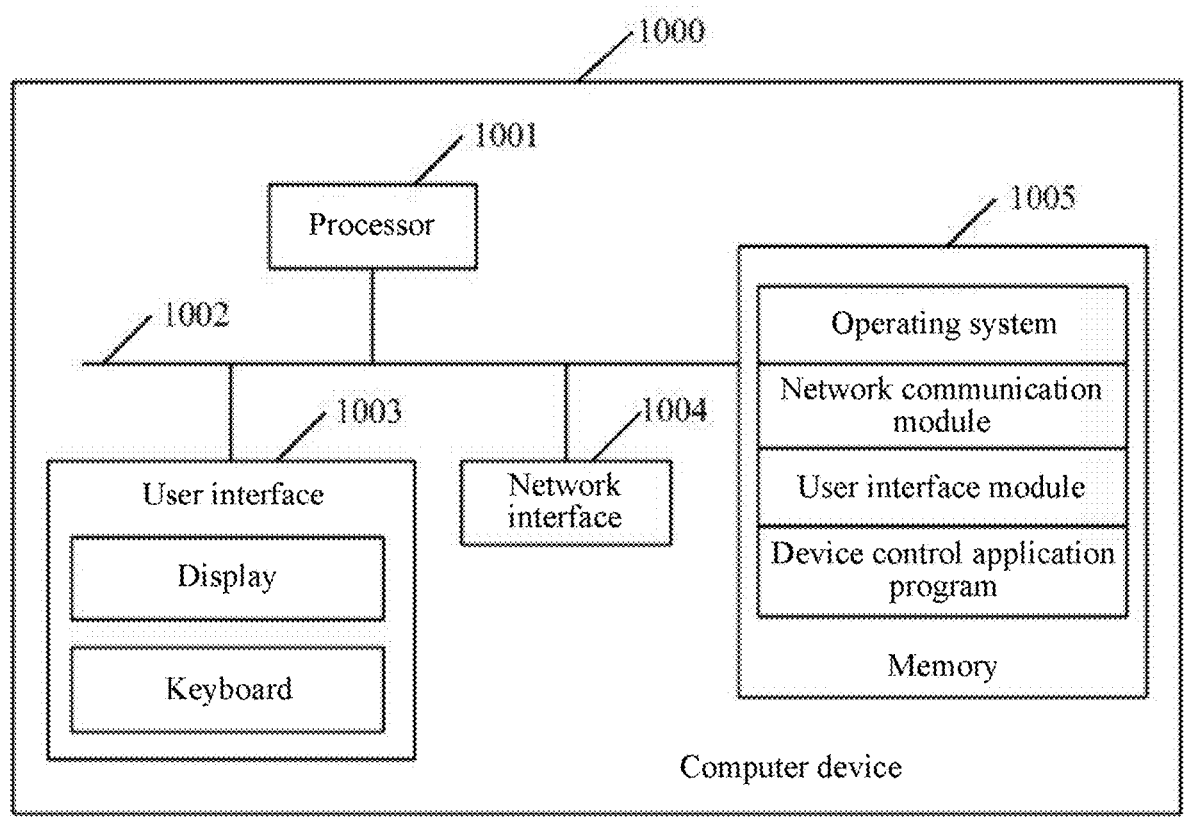
FIG. 13 is a schematic structural diagram of a computer device according to an embodiment of this disclosure.

FIG. 13 is a schematic structural diagram of a computer device according to an embodiment of this disclosure. As shown in FIG. 13, a computer device 1000 may include: a processor 1001, a network interface 1004, and a memory 1005, as well as a user interface 1003 and at least one communication bus 1002. The communication bus 1002 is configured to implement connection and communication between these components. The user interface 1003 may include a display and a keyboard. The user interface 1003 may further include a standard wired interface and a standard wireless interface. In an example, the network interface 1004 may include a standard wired interface and a standard wireless interface (such as a Wi-Fi interface). The memory 1005 may be a high-speed random access memory (RAM), or may be a non-volatile memory, for example, at least one magnetic disk storage. In an example, the memory 1005 may be at least one storage apparatus that is located far away from the foregoing processor 1001. As shown in FIG. 13, the memory 1005 used as a computer-readable storage medium may include an operating system, a network communication module, a user interface module, and a device control application program.

In the computer device 1000 shown in FIG. 13, the network interface 1004 may provide a network communication function, the user interface 1003 is mainly configured to provide an input interface, and the processor 1001 may be configured to invoke the device control application program stored in the memory 1005, and perform the following operations:

obtaining a first management frame for performing a network connection from a to-be-accessed Internet of things device, the first management frame including device attribute information of the Internet of things device;

parsing the first management frame to obtain device attribute information of the Internet of things device;

transmitting the device attribute information of the Internet of things device to a terminal device connected to the network device, the device attribute information of the Internet of things device being for indicating the terminal device to perform verification on validity of the Internet of things device;

generating a second management frame carrying network attribute information of the network device in a case (e.g., based on a determination) that a target verification result transmitted by the terminal device is received, the target verification result being for indicating that the Internet of things device is valid; and transmitting the second management frame to the Internet of things device, the second management frame being for indicating the Internet of things device to establish a network connection with the network device based on the network attribute information in the second management frame.

In an example, the processor 1001 may be configured to invoke the device control application program stored in the memory 1005, to implement the following operations:

broadcasting a first management frame carrying device attribute information of the Internet of things device to a network device, the first management frame being for indicating the network device to transmit the device attribute information of the Internet of things device in the first management frame to a terminal device, the device attribute information of the Internet of things device being for indicating the terminal device to perform verification on validity of the Internet of things device, and the terminal device being connected to the network device;

receiving a second management frame transmitted by the network device, the second management frame being generated by the network device according to network attribute information of the network device in a case (e.g., based on a determination) that a target verification result indicating that the Internet of things device is valid is received;

parsing the second management frame, to obtain the network attribute information of the network device; and establishing a network connection with the network device according to the network attribute information.

In an example, the processor 1001 may be configured to invoke the device control application program stored in the memory 1005, to implement the following operations:

obtaining device attribute information of a to-be-accessed Internet of things device from a network device, the device attribute information being obtained by the Internet of things device by parsing a first management frame transmitted by the Internet of things device;

performing verification on validity of the Internet of things device according to the device attribute information;

generating, in response to determining that the Internet of things device is valid, a target verification result for indicating that the Internet of things device is valid; and transmitting the target verification result to the network device, the target verification result being for indicating the network device to transmit a second management frame to the Internet of things device, the second management frame carrying network attribute information of the network device, and the second management frame being for indicating the Internet of things device to establish a network connection with the network device based on the network attribute information in the second management frame.

In this disclosure, in a case that an Internet of things device needs to communicate with a terminal device, the Internet of things device may generate a first management frame carrying device attribute information of the Internet of things device, and transmit the first management frame to a network device connected to the terminal device. After the first management frame is received, the network device may transmit the device attribute information of the Internet of things device to the terminal device. In a case (e.g., based on a determination) that the device attribute information of the Internet of things device is received, the terminal device may perform verification on validity of the Internet of things device according to the device attribute information of the Internet of things device, to obtain a verification result, and return the verification result to the network device. In a case (e.g., based on a determination) that the verification result is a target verification result for indicating that the Internet of things device is valid, the network device may generate a second management frame according to network attribute information of the network device, and transmit the second management frame to the Internet of things device. After the second management frame is received, the Internet of things device may establish a network connection with the network device according to the network attribute information. It can be seen that, in a process of performing a network connection with the Internet of things device, the network device transmits the network attribute information in the second management frame to the Internet of things device, and a user does not need to manually input the network attribute information, so that network connection efficiency of the Internet of things device can be improved, in other words, rapid network distribution of the Internet of things device is achieved.

It is to be understood that, the computer device 1000 described in an embodiment of this disclosure may implement the descriptions of the network connection method in the embodiments corresponding to FIG. 5, FIG. 6, and FIG. 9, or the descriptions of the network connection apparatus in the embodiment corresponding to FIG. 10, FIG. 11, and FIG. 12. Details are not described herein again. In addition, the descriptions of beneficial effects of the same method are not described herein again.

One or more modules, submodules, and/or units of the apparatus can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language and stored in memory or non-transitory computer-readable medium. The software module stored in the memory or medium is executable by a processor to thereby cause the processor to perform the operations of the module. A hardware module may be implemented using processing circuitry, including at least one processor and/or memory. Each hardware module can be implemented using one or more processors (or processors and memory). Likewise, a processor (or processors and memory) can be used to implement one or more hardware modules. Moreover, each module can be part of an overall module that includes the functionalities of the module. Modules can be combined, integrated, separated, and/or duplicated to support various applications. Also, a function being performed at a particular module can be performed at one or more other modules and/or by one or more other devices instead of or in addition to the function performed at the particular module. Further, modules can be implemented across multiple devices and/or other components local or remote to one another. Additionally, modules can be moved from one device and added to another device, and/or can be included in both devices.

In addition, an embodiment of this disclosure further provides a computer-readable storage medium, such as a non-transitory computer-readable storage medium. The computer-readable storage medium stores a computer program executed by the foregoing network connection apparatus, and the computer program includes program instructions. When executing the program instructions, the processor can implement the descriptions of the network connection method in the embodiments corresponding to FIG. 5, FIG. 6, and FIG. 9. Therefore, details are not described herein again. In addition, the descriptions of beneficial effects of the same method are not described herein again. For technical details that are not disclosed in the embodiment of the computer-readable storage medium of this disclosure, refer to the descriptions of the method embodiments of this disclosure.

In an example, the program instructions may be deployed on one computer device for execution, or deployed on at least two computer devices at one location, or executed on at least two computer devices distributed in at least two locations and interconnected through a communication network. The at least two computer devices distributed in the at least two locations and interconnected through the communication network may form a blockchain network.

The computer-readable storage medium may be any internal storage unit of the network connection apparatus or the computer device described in any one of the foregoing embodiments, for example, a hard disk or a main memory of the computer device. In an example, the computer-readable storage medium may be an external storage device of the computer device, for example, a removable hard disk, a smart memory card (SMC), a secure digital (SD) card, or a flash card equipped on the computer device. In an example, the computer-readable storage medium may include both an internal storage unit and an external storage device of the computer device. The computer-readable storage medium is configured to store the computer program and another program and data that are required by the computer device. The computer-readable storage medium may be further configured to temporarily store data that has been outputted or data to be outputted.

In the specification, claims, and accompanying drawings of the embodiments of this disclosure, the terms "first", "second", or the like are intended to distinguish between different objects but do not indicate a particular order. In addition, the term "include" and any variant thereof are intended to cover a non-exclusive inclusion. For example, a process, method, apparatus, product, or device that includes a series of steps or units is not limited to the listed steps or modules; and instead, may further include a step or module that is not listed, or may further include another step or unit that is intrinsic to the process, method, apparatus, product, or device.

An embodiment of this disclosure further provides a computer program product, including computer programs/instructions, the computer programs/instructions, when executed by a processor, implementing the descriptions of the foregoing network connection method in the embodiments corresponding to FIG. 3 and FIG. 4. Therefore, details are not described herein again. In addition, the descriptions of beneficial effects of the same method are not described herein again. For examples of technical details that are not disclosed in the embodiment of the computer program product of this disclosure, reference may be made to the descriptions of the method embodiments of this disclosure.

A person of ordinary skill in the art may be aware that, in combination with examples of units and algorithm steps described in the embodiments disclosed in this specification, this disclosure may be implemented by using electronic hardware, computer software, or a combination thereof. To describe interchangeability between the hardware and the software, compositions and steps of each example have been generally described according to functions in the foregoing descriptions. Whether these functions are performed by hardware or software depends on particular applications and design constraints of the technical solutions. A person skilled in the art may use different methods to implement the described functions for each particular application, but it is not to be considered that the implementation goes beyond the scope of this disclosure.

The methods and related apparatuses provided in the embodiments of this disclosure are described with reference to the method flowcharts and/or structural schematic diagrams provided in the embodiments of this disclosure. For example, each process and/or block in the method flowcharts and/or structural schematic diagrams, and combinations of processes and/or blocks in flowcharts and/or block diagrams may be implemented by the computer program instructions. These computer program instructions may be provided to a general-purpose computer, a special-purpose computer, an embedded processor, or a processor of another programmable network connection device to generate a machine, so that an apparatus configured to implement functions specified in one or more procedures in the flowcharts and/or one or more blocks in the structural schematic diagrams is generated by using instructions executed by the general-purpose computer or the processor of another programmable network connection device. These computer program instructions may also be stored in a computer-readable memory that can guide a computer or another programmable network connection device to work in a specific manner, so that the instructions stored in the computer-readable memory generate a product including an instruction apparatus, where the instruction apparatus implements functions specified in one or more procedures in the flowcharts and/or one or more blocks in the structural schematic diagrams. These computer program instructions may also be loaded into a computer or another programmable network connection device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the structural schematic diagrams.

The use of "at least one of" or "one of" in the disclosure is intended to include any one or a combination of the recited elements. For example, references to at least one of A, B, or C; at least one of A, B, and C; at least one of A, B, and/or C; and at least one of A to C are intended to include only A, only B, only C or any combination thereof. References to one of A or B and one of A and B are intended to include A or B or (A and B). The use of "one of" does not preclude any combination of the recited elements when applicable, such as when the elements are not mutually exclusive.

What are disclosed above are merely examples of the embodiments of this disclosure, and certainly are not intended to limit the protection scope of this disclosure. Therefore, equivalent variations shall fall within the scope of this disclosure.

What is claimed is:

1. A network connection method, comprising:
   receiving, by a network device from an Internet of things device, a first management frame for performing a network connection, the first management frame including device attribute information of the Internet of things device;
   transmitting, by the network device to a terminal device connected to the network device, the device attribute information of the Internet of things device;
   receiving, by the network device from the terminal device, a target verification result of a validity verification of the Internet of things device that is performed in response to the device attribute information;
   generating, by the network device, a second management frame that includes network attribute information of the network device based on the target verification result, the target verification result indicating that the Internet of things device is valid; and
   transmitting, by the network device to the Internet of things device, the second management frame that indicates the Internet of things device is to establish a network connection with the network device based on the network attribute information in the second management frame.

2. The method according to claim 1, further comprising:
   parsing the first management frame to obtain the device attribute information of the Internet of things device.

3. The method according to claim 1, wherein the generating the second management frame comprises:
   obtaining a shared key between the Internet of things device and the network device;
   encrypting the network attribute information of the network device with the shared key, to obtain a ciphertext of the network attribute information; and
   generating the second management frame according to the ciphertext of the network attribute information, the second management frame indicating the Internet of things device is to decrypt the ciphertext of the network attribute information in the second management frame, to obtain the network attribute information of the network device.

4. The method according to claim 3, wherein the obtaining the shared key comprises:
   obtaining a shared prime between the Internet of things device and the network device;
   obtaining a private key of the network device;
   obtaining a public key of the Internet of things device from the device attribute information of the Internet of things device;
   obtaining a first value according to the public key to the $K^{th}$ power of the Internet of things device, wherein K is determined according to the private key of the network device; and
   performing modulo processing on the first value and the shared prime, to obtain the shared key between the Internet of things device and the network device.

5. The method according to claim 3, wherein the generating the second management frame according to the ciphertext of the network attribute information comprises:

determining a data length in the ciphertext of the network attribute information; and generating the second management frame according to the data length and the ciphertext of the network attribute information.

6. The method according to claim 4, further comprising:
obtaining a shared basic integer between the Internet of things device and the network device;
obtaining a second value according to the shared basic integer to the $K^{th}$ power; and
performing modulo processing on the second value and the shared prime, to obtain the public key of the network device.

7. The method according to claim 6, further comprising:
generating a third management frame that includes the public key of the network device; and
transmitting the third management frame to the Internet of things device, the third management frame indicating the Internet of things device is to decrypt the ciphertext of the network attribute information in the second management frame according to the private key of the Internet of things device and the public key of the network device in the third management frame, to obtain the network attribute information of the network device.

8. The method according to claim 1, wherein the transmitting the device attribute information comprises:
transmitting the device attribute information to the terminal device indicating the terminal device is to perform on the validity verification of the Internet of things device according to a device identifier of the Internet of things device, to obtain the target verification result, and transmit the verification result to the network device.

9. A network connection method, comprising:
broadcasting, from an Internet of things device to a network device, a first management frame including device attribute information of the Internet of things device, the first management frame indicating the network device is to transmit the device attribute information of the Internet of things device in the first management frame to a terminal device, the device attribute information of the Internet of things device indicating the terminal device is to perform validity verification of the Internet of things device;
receiving a second management frame from the network device, the second management frame being generated by the network device according to network attribute information of the network device based on a determination that a target verification result of the validity verification indicating that the Internet of things device is valid is received;
parsing the second management frame, to obtain the network attribute information of the network device; and
establishing a network connection with the network device according to the network attribute information.

10. The method according to claim 9, wherein the parsing the second management frame comprises:
obtaining a ciphertext of the network attribute information of the network device from a data body of the second management frame;
obtaining a shared key between the Internet of things device and the network device; and
decrypting the ciphertext of the network attribute information by using the shared key, to obtain the network attribute information of the network device.

11. The method according to claim 10, wherein the obtaining the shared key comprises:
obtaining a shared prime between the Internet of things device and the network device;
obtaining a private key of the Internet of things device;
obtaining a public key of the network device;
obtaining a third value according to the public key to the $M^{th}$ power of the network device, wherein M is determined according to the private key of the Internet of things device; and
performing modulo processing on the third value and the shared prime, to obtain the shared key between the Internet of things device and the network device.

12. The method according to claim 11, wherein the obtaining the private key comprises:
generating a random number according to the device attribute information of the Internet of things device, and
determining the random number as the private key of the Internet of things device.

13. The method according to claim 11, wherein the obtaining the public key comprises:
receiving a third management frame transmitted by the network device; and
parsing the third management frame to obtain the public key of the network device.

14. The method according to claim 11, further comprising:
obtaining a device identifier of the Internet of things device;
obtaining a shared basic integer between the Internet of things device and the network device;
obtaining a fourth value according to the shared basic integer to the $M^{th}$ power; and
performing modulo processing on the fourth value and the shared prime, to obtain the public key of the Internet of things device.

15. The method according to claim 14, further comprising:
determining the device identifier of the Internet of things device and the public key of the Internet of things device as the device attribute information of the Internet of things device; and
generating the first management frame including the device attribute information of the Internet of things device according to the network attribute information of the network device.

16. A network connection method, comprising:
receiving, by a mobile device from a network device, device attribute information of a to-be-accessed Internet of things device, the device attribute information being obtained by parsing a first management frame transmitted by the Internet of things device;
performing validity verification of the Internet of things device according to the device attribute information;
generating, in response to determining that the validity verification of the Internet of things device is valid, a target verification result for indicating that the Internet of things device is valid; and
transmitting the target verification result to the network device, the target verification result indicating the network device is to transmit a second management frame to the Internet of things device, the second management frame including network attribute information of the network device, and the second management frame indicating the Internet of things device is to establish a network connection with the network device based on the network attribute information in the second management frame.

17. The method according to claim 16, wherein the performing the validity verification comprises:
  obtaining terminal attribute information of a terminal device;
  obtaining, from a blockchain network, a node device that does not have an association relationship with the terminal attribute information of the terminal device as a consensus node device; and
  transmitting the device attribute information of the Internet of things device to the consensus node device, the device attribute information of the Internet of things device indicating the consensus node device is to perform verification on the validity of the Internet of things device.

18. The method according to claim 17, wherein the generating the target verification result comprises:
  generating, based on a determination that a candidate verification result indicating that the verification performed on the consensus node device on the Internet of things device succeeds is received, the target verification result for indicating that the Internet of things device is valid.

19. The method according to claim 18, wherein the generating, based on the determination that the candidate verification result indicating that the verification performed on the consensus node device on the Internet of things device succeeds is received, the target verification result for indicating that the Internet of things device is valid comprises:
  counting a quantity of devices whose transmitted candidate verification results are that the verification succeeds in the consensus node device, and a total quantity of devices in the consensus node device;
  determining a verification success rate of the Internet of things device according to the quantity of devices and the total quantity of devices; and
  determining, based on a determination that the verification success rate of the Internet of things device is greater than or equal to a verification success rate threshold, that the Internet of things device is valid, and generating the target verification result for indicating that the Internet of things device is valid.

20. The method according to claim 16, wherein
the device attribute information includes a device identifier of the Internet of things device;
the performing the validity verification includes:
  invoking a validity detection component, to obtain a device identifier set corresponding to the Internet of things device associated with a terminal device, and
  determining, based on a determination that the device identifier of the Internet of things device belongs to the device identifier set, that the Internet of things device is valid; and
the generating the target verification result includes generating the target verification result for indicating that the Internet of things device is valid.

* * * * *